United States Patent
Vijayaraghavan et al.

(10) Patent No.: US 9,519,936 B2
(45) Date of Patent: Dec. 13, 2016

(54) METHOD AND APPARATUS FOR ANALYZING AND APPLYING DATA RELATED TO CUSTOMER INTERACTIONS WITH SOCIAL MEDIA

(75) Inventors: Ravi Vijayaraghavan, Bangalore (IN); Ravi Garikipati, Bangalore (IN); Andrew Chang, Palo Alto, CA (US); Pallipuram V. Kannan, Los Gatos, CA (US)

(73) Assignee: 24/7 Customer, Inc., Campbell, CA (US)

( * ) Notice: Subject to any disclaimer, the term of this patent is extended or adjusted under 35 U.S.C. 154(b) by 478 days.

(21) Appl. No.: 13/461,631

(22) Filed: May 1, 2012

(65) Prior Publication Data

US 2012/0233258 A1 Sep. 13, 2012

Related U.S. Application Data

(62) Division of application No. 13/349,807, filed on Jan. 13, 2012.

(60) Provisional application No. 61/434,256, filed on Jan. 19, 2011, provisional application No. 61/485,054, filed on May 11, 2011.

(51) Int. Cl.
| | |
|---|---|
| *G06F 11/30* | (2006.01) |
| *G06Q 50/00* | (2012.01) |
| *G06Q 10/06* | (2012.01) |
| *G06F 17/30* | (2006.01) |
| *G06Q 30/02* | (2012.01) |

(52) U.S. Cl.
CPC ......... *G06Q 50/01* (2013.01); *G06F 17/30539* (2013.01); *G06Q 10/0637* (2013.01); *G06Q 30/02* (2013.01)

(58) Field of Classification Search
CPC .... G06Q 50/01; G06Q 10/0637; G06Q 30/02; G06F 17/30539
USPC .......... 709/204–206, 224, 223; 715/751–759
See application file for complete search history.

(56) References Cited

U.S. PATENT DOCUMENTS

| | | | |
|---|---|---|---|
| 6,587,556 B1 | 7/2003 | Judkins et al. | |
| 7,600,017 B2 * | 10/2009 | Holtzman et al. | ............ 709/224 |
| 7,631,007 B2 | 12/2009 | Morris | |
| 7,673,340 B1 | 3/2010 | Cohen et al. | |
| 8,140,703 B2 | 3/2012 | Morris et al. | |
| 8,296,373 B2 | 10/2012 | Bosworth et al. | |
| 8,370,155 B2 | 2/2013 | Byrd et al. | |
| 8,488,774 B2 | 7/2013 | Mahalaha et al. | |
| 2002/0062368 A1 * | 5/2002 | Holtzman et al. | ............ 709/224 |
| 2004/0236832 A1 | 11/2004 | Morris et al. | |
| 2008/0065471 A1 | 3/2008 | Reynolds et al. | |

(Continued)

FOREIGN PATENT DOCUMENTS

WO 0073955 12/2000

OTHER PUBLICATIONS

Bar-Hillel, et al., "Learning a Mahalanobis Metric from Equivalence Constraints", Journal of Machine Learning Research, Apr. 2005, pp. 1-29.

(Continued)

*Primary Examiner* — Kenneth R Coulter
(74) *Attorney, Agent, or Firm* — Michael A. Glenn; Perkins Coie LLP

(57) ABSTRACT

Embodiments of the invention provide techniques that quantize community interactions with social media to understand and influence consumer experiences.

34 Claims, 33 Drawing Sheets

(56) References Cited

U.S. PATENT DOCUMENTS

| | | | |
|---|---|---|---|
| 2008/0077572 | A1 | 3/2008 | Boyle et al. |
| 2008/0167952 | A1 | 7/2008 | Blair |
| 2008/0189380 | A1 | 8/2008 | Bosworth et al. |
| 2008/0249764 | A1 | 10/2008 | Huang et al. |
| 2009/0012826 | A1 | 1/2009 | Eilam et al. |
| 2009/0119281 | A1 | 5/2009 | Wang et al. |
| 2009/0222313 | A1 | 9/2009 | Kannan et al. |
| 2009/0228264 | A1 | 9/2009 | Williams et al. |
| 2009/0249279 | A1 | 10/2009 | Bourdon |
| 2010/0002863 | A1 | 1/2010 | Loftus et al. |
| 2010/0049679 | A1 | 2/2010 | Phillips |
| 2010/0104087 | A1 | 4/2010 | Byrd et al. |
| 2010/0119053 | A1 | 5/2010 | Goeld |
| 2010/0138282 | A1 | 6/2010 | Kannan et al. |
| 2010/0191658 | A1 | 7/2010 | Kannan et al. |
| 2010/0257117 | A1 | 10/2010 | Shvadron et al. |
| 2010/0275128 | A1 | 10/2010 | Ward et al. |
| 2010/0325107 | A1 | 12/2010 | Kenton et al. |
| 2010/0332287 | A1 | 12/2010 | Gates et al. |
| 2011/0276513 | A1* | 11/2011 | Erhart et al. ............... 705/347 |
| 2012/0259919 | A1 | 10/2012 | Yan et al. |
| 2013/0166457 | A1 | 6/2013 | Du et al. |

OTHER PUBLICATIONS

Basu, et al., "A Probabilistic Framework for Semi-Supervised Clustering", Proc. of the Tenth ACM SIGKDD Int'l Conference on Knowledge Discovery and Data Mining, Seattle, WA, Aug. 2004, pp. 59-68.
Basu, et al., "Active Semi-Supervision for Pairwise Constrained Clustering", Proc. of the SIAM Int'l Conference on Data Mining, Lake Buena Vista, FL, Apr. 2004, pp. 333-344.
Basu, et al., "Semi-supervised Clustering by Seeding", Proc. of the 19th Int'l Conference on Machine Learning, Sydney, Australia, Jul. 2002, pp. 19-26.
Bilenko, et al., "Integrating Constraints and Metric Learning in Semi-Supervised Clustering", Proc. of the 21st Int'l Conference on Machine Learning, Banff, Canada, Jul. 2004, pp. 81-88.
Chuang, et al., "Emotion Recognition From Textual Input Using an Emotional Semantic Network", ICSLP 2002, Denver, Sep. 2002, pp. 2033-2036.
Chuang, et al., "Enriching Web Taxonomies through Subject Categorization of Query Terms from Search Engine Logs", Decision Support Systems, vol. 35, No. 1, Apr. 2003, 18 pages.
Cover, T.M., "Nearest Neighbor Pattern Classification", IEEE Transactions on Information Theory, vol. IT-13, No. 1, Jan. 1997, pp. 21-27.
Cowie, et al., "Describing the emotional states that are expressed in speech", Speech Communication Special Issue on Speech and Emotion, Jun. 2002, 28 pages.
Cutting, et al., "Scatter/Gather: A Cluster-based Approach to Browsing Large Document Collections", ACM 15th Annual Int'l SIGIR '92, Jun. 1992, 12 pages.
Domingos, et al., "On the Optimality of the Simple Bayesian Classifier under Zero-One Loss", Kluwer Academic Publishers, Boston., Nov. 1997, 30 pages.
Friedman, N. et al., "Bayesian Network Classifiers", Machine Learning, vol. 29, Nov. 1997, pp. 131-163.
Griffin, et al., "The Voice of the Customer", Marketing Science, vol. 12, No. 1, Winter 1993, 27 pages.
Haichao, et al., "Structural Analysis of Chat Messages for Topic Detection", Online Information Review, vol. 30, No. 5, Sep. 2006, 33 pages.
Jain, et al., "Data Clustering: A Review", ACM Computing Surveys, Sep. 1999, pp. 264-323.
Johnson, S.C., "Hierarchical Clustering Schemes", Psychometrika, vol. 32, No. 3, Sep. 1967, pp. 2741-254.
Kose, et al., "A Comparison of Textual Data Mining Methods for Sex Identification in Chat Conversations", LNCS 4993, Jan. 2008, pp. 938-643.
Langley, et al., "An Analysis of Bayesian Classifiers", Proceedings of the Tenth National Conference on Artificial Intelligence, Jul. 1992, pp. 223-228.
Liu, et al., "A Model of Textual Affect Sensing using Real-World Knowledge", ACM IUI '03, Miami, Florida, USA, Jan. 2003, 8 pages.
McQueen, , "Some methods for classification and analysis of multivariate observations", Proc. of Symposium on Mathematics, Statistics & Probability held Jun. 21-Jul. 18, 1965 and Dec. 27, 1965-Jan. 7, 1966, Berkeley, California, 1967, pp. 281-298.
Mehta, et al., "SLIQ: A Fast Scalable Classifier for Data Mining", Int'l Conference on Extending Database Technology, Mar. 1996, 15 pages.
Quinlan, J.R., "Induction of Decision Trees", Machine Learning 1, 1986, pp. 81-106.
Ruiz, et al., "Hierarchical Text Categorization Using Neural Networks", Kluwer Academic Publishers, Jan. 2002, 40 pages.
Sebastiani, F., "Machine Learning in Automated Text Categorization", ACM Computing Surveys, vol. 34, No. 1, Mar. 2002, pp. 1-47.
Steinbach, et al., "A Comparison of Document Clustering Techniques", In KDD Workshop on Text Mining, Boston, MA, Aug. 2000, 20 pages.
Tang, et al., "Bias Analysis in Text Classification for Highly Skewed Data", Fifth IEEE Int'l Conference on Data Mining, Nov. 2005, 8 pages.
Wagstaff, et al., "Constrained K-means Clustering with Background Knowledge", In Proceedings of the 18th Int'l Conference on Machine Learning, Jun. 2001, 8 pages.
Wetzker, et al., "Tailoring Taxonomies for Effieicent Text Categorization and Expert Finding", IEEE/WIC/ACM Int'l Conference on Web Intelligence and Intelligent Agent Technology, vol. 3, Dec. 2008, pp. 459-462.
Wong, et al., "Incremental Document Clustering for Web Page Classification", IEEE Int'l Conference on Information Society in the 21st Century: Emerging Technologies and New Challenges, Japan, Jul. 1, 2000, 21 pages.
Xiang, et al., "Learning a Mahalanobis distance metric for data clustering and classification", Pattern Recognition, vol. 41, Dec. 2008, pp. 3600-3612.
Xing, et al., "Distance metric learning, with application to clustering with side-information", Advances in Neural Information Processing Systems, vol. 15, Dec. 2003, pp. 505-512.
Yang, et al., "A re-examination of text categorization methods", Proceedings of the 22nd Annual Int'l ACM SIGIR Conference on Research and Development in Information Retrieval, Berkeley, CA, USA, Aug. 1999, pp. 42-49.
Zamir, et al., "Fast and Intuitive Clustering of Web Documents", American Association for Artificial Intelligence, KDD-97 Proceedings, Newport Beach, CA, Aug. 1997, pp. 287-290.
Zhang, H. , "Exploring Conditions for the Optimatlity of Naive Bayes", Int'l Journal of Pattern Recognition and Artificial Intelligence, vol. 19, No. 2, World Scientific Publishing Co., Mar. 2005, pp. 183-198.
Zhao, et al., "Empirical and Theoretical Comparisons of Selected Criterion Functions for Document Clustering", Machine Learning, Kluwer Academic Publishers, Jun. 2004, pp. 311-331.
Zhao, et al., "Hierarchical Clustering Algorithms for Document Datasets", Data Mining and Knowledge Discovery, vol. 10, Mar. 2005, pp. 141-168.

\* cited by examiner

METHOD AND APPARATUS FOR ANALYZING AND APPLYING DATA RELATED TO CUSTOMER INTERACTIONS WITH SOCIAL MEDIA

CROSS REFERENCE TO RELATED APPLICATIONS

This application is a divisional of co-pending U.S. patent application Ser. No. 13/349,807, filed Jan. 13, 2012, which claims priority to U.S. provisional Pat. application Ser. No. 61/434,256, filed Jan. 19, 2011, and U.S. provisional patent application Ser. No. 61/485,054, dated May 11, 2011, each of which is incorporated herein in its entirety by this reference thereto.

BACKGROUND OF THE INVENTION

Technical Field

The invention relates to the use of social media. More particularly, the invention relates to techniques for analyzing and applying data related to customer interactions with social media.

Description of the Background Art

The term 'social media' refers to the use of Web-based and mobile technologies to turn communication into an interactive dialogue (see http://en.wikipedia.org/wiki/Social_media). FIG. 1 is an example of the share buttons common to many social Web pages. Andreas Kaplan and Michael Haenlein define social media as "a group of Internet-based applications that build on the ideological and technological foundations of Web 2.0, and that allow the creation and exchange of user-generated content." (see Kaplan, Andreas M.;

Michael Haenlein (2010); *Users of the world, unite! The challenges and opportunities of Social Media; Business Horizons* 53 (1): 59-68)

Social media are media for social interaction, as a superset beyond social communication. Enabled by ubiquitously accessible and scalable communication techniques, social media substantially change the way of communication between organizations, communities, as well as individuals.

Social media take on many different forms, including Internet forums, Weblogs, social blogs, microblogging, wikis, podcasts, photographs or pictures, video, rating, and social bookmarking. By applying a set of theories in the field of media research, e.g. social presence, media richness, and social processes, e.g. self-presentation, self-disclosure, Kaplan and Haenlein (ibid) created a classification scheme for different social media types. According to Kaplan and Haenlein there are six different types of social media: collaborative projects, e.g. Wikipedia, blogs and microblogs, e.g. Twitter, content communities, e.g. YouTube, social networking sites, e.g. Facebook, virtual game worlds, e.g. World of Warcraft, and virtual social worlds, e.g. Second Life. Technologies include: blogs, picture-sharing, vlogs, wall postings, email, instant messaging, music-sharing, crowd-sourcing, and voice over IP, to name a few. Many of these social media services can be integrated via social network aggregation platforms.

Kietzmann et al. (see Kietzmann, Jan H.; Kris Hermkens, Ian P. McCarthy, and Bruno S. Silvestre (2011); *Social media? Get serious! Understanding the functional building blocks of social media*; Business Horizons 54 (3): 241-251.) present a honeycomb framework that defines how social media services focus on some or all of seven functional building blocks: identity, conversations, sharing, presence, relationships, reputation, and groups. These building blocks help understand the engagement needs of the social media audience. For instance, LinkedIn users care mostly about identity, reputation, and relationships, whereas YouTube's primary building blocks are sharing, conversations, groups, and reputation.

Kietzmann et al. (ibid) contend that social media presents an enormous challenge for firms, as many established management methods are ill-suited to deal with customers who no longer want to be talked at, but who want firms to listen, appropriately engage, and respond. The authors explain that each of the seven functional building blocks has important implications for how firms should engage with social media. By analyzing identity, conversations, sharing, presence, relationships, reputation, and groups, firms can monitor and understand how social media activities vary in terms of their function and impact, so as to develop a congruent social media strategy based on the appropriate balance of building blocks for their community.

According to the European Journal of Social Psychology, one of the key components in successful social media marketing implementation is building social authority. Social authority is developed when an individual or organization establishes themselves as an expert in their given field or area, thereby becoming an influencer in that field or area. It is through this process of building social authority that social media becomes effective. That is why one of the foundational concepts in social media has become that you cannot completely control your message through social media but, rather, you can simply begin to participate in the conversation expecting that you can achieve a significant influence in that conversation.

However, this conversation participation must be cleverly executed because while people are resistant to marketing in general, they are even more resistant to direct or overt marketing through social media platforms. This may seem counter-intuitive, but is the main reason building social authority with credibility is so important. A marketer can generally not expect people to be receptive to a marketing message in and of itself. In the Edleman Trust Barometer report in 2008, the majority (58%) of the respondents reported they most trusted company or product information coming from "people like me" inferred to be information from someone they trusted. In the 2010 Trust Report, the majority switched to 64% preferring their information from industry experts and academics. According to Inc. Technology's Brent Leary, "This loss of trust, and the accompanying turn towards experts and authorities, seems to be coinciding with the rise of social media and networks."

It has been observed that Facebook is now the primary method for communication by college students in the U.S. There are various statistics that account for social media usage and effectiveness for individuals worldwide. Some of the most recent statistics are as follows:

Social networking now accounts for 22% of all time spent online in the US. A total of 234 million people age 13 and older in the U.S. used mobile devices in December 2009.

Twitter processed more than one billion tweets in December 2009 and averages almost 40 million tweets per day Over 25% of U.S. Internet page views occurred at one of the top social networking sites in December 2009, up from 13.8% a year before.

Australia has some of the highest social media usage in the world. In usage of Facebook Australia ranks highest, with over 9 million users spending almost 9 hours per month on the site.

The number of social media users age 65 and older grew 100 percent throughout 2010, so that one in four people in that age group are now part of a social networking site.

As of June 2011 Facebook has 750 Million users

According to a report by Nielson "In the U.S. alone, total minutes spent on social networking sites has increased 83 percent year-over-year. In fact, total minutes spent on Facebook increased nearly 700 percent year-over-year, growing from 1.7 billion minutes in April 2008 to 13.9 billion in April 2009, making it the No. 1 social networking site for the month."

The main increase in social media has been Facebook. It was ranked as the number one social networking site. Approximately 100 million users access this site through their mobile phone. According to Nielsen, global consumers spend more than six hours on social networking sites. "Social Media Revolution" produced by Socialnomics author Erik Qualman contains numerous statistics on Social Media, including the fact that 93% of businesses use it for marketing and that if Facebook were a country it would be the third largest. In an effort to supplant Facebook's dominance, Google launched Google+ in the summer of 2011.

Thus, using social media as a form of marketing has taken on whole new challenges. As the 2010 Trust Study indicates, it is most effective if marketing efforts through social media revolve around the genuine building of authority. Someone performing a marketing role within a company must honestly convince people of their genuine intentions, knowledge, and expertise in a specific area or industry through providing valuable and accurate information on an ongoing basis without a marketing angle overtly associated. If this can be done, trust with, and of, the recipient of that information—and that message itself—begins to develop naturally. This person or organization becomes a thought leader and value provider—setting themselves up as a trusted advisor instead of marketer. Top of mind awareness develops and the consumer naturally begins to gravitate to the products and/or offerings of the authority/influencer.

As a result of social media, and the direct or indirect influence of social media marketers, today consumers are as likely, or more likely, to make buying decisions based on what they read and see in platforms we call social, but only if presented by someone they have come to trust. Additionally, reports have shown organizations have been able to bring back dissatisfied customers and stakeholders through social media channels. This is why a purposeful and carefully designed social media strategy has become an integral part of any complete and directed marketing plan but must also be designed using newer authority building techniques.

Given the significance of social media and the potential for influencing consumer behavior, it would be advantageous to develop techniques that quantize community interactions with social media to understand and influence consumer experiences.

SUMMARY OF THE INVENTION

Embodiments of the invention provide techniques that quantize community interactions with social media to understand and influence consumer experiences.

DETAILED DESCRIPTION OF THE INVENTION

Customer Experience—Social Media Strategy

Figure 1:
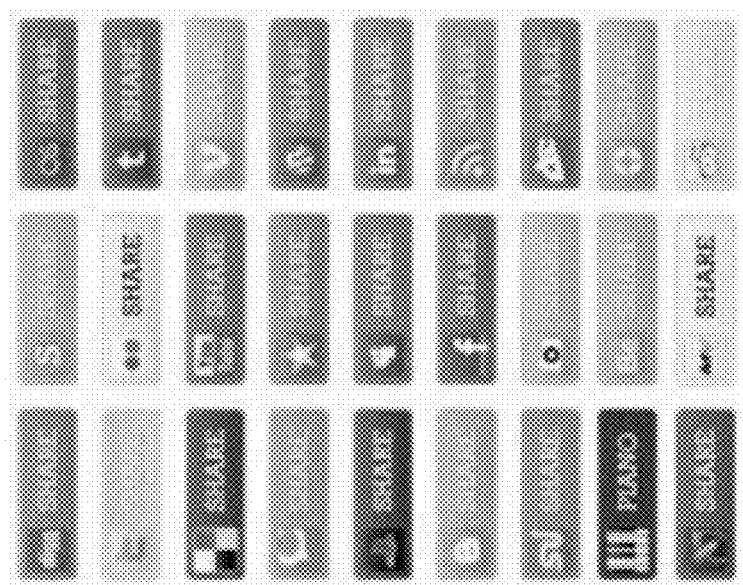
FIG. 1 is an example of the share buttons common to many social Web pages.
Figure 2:
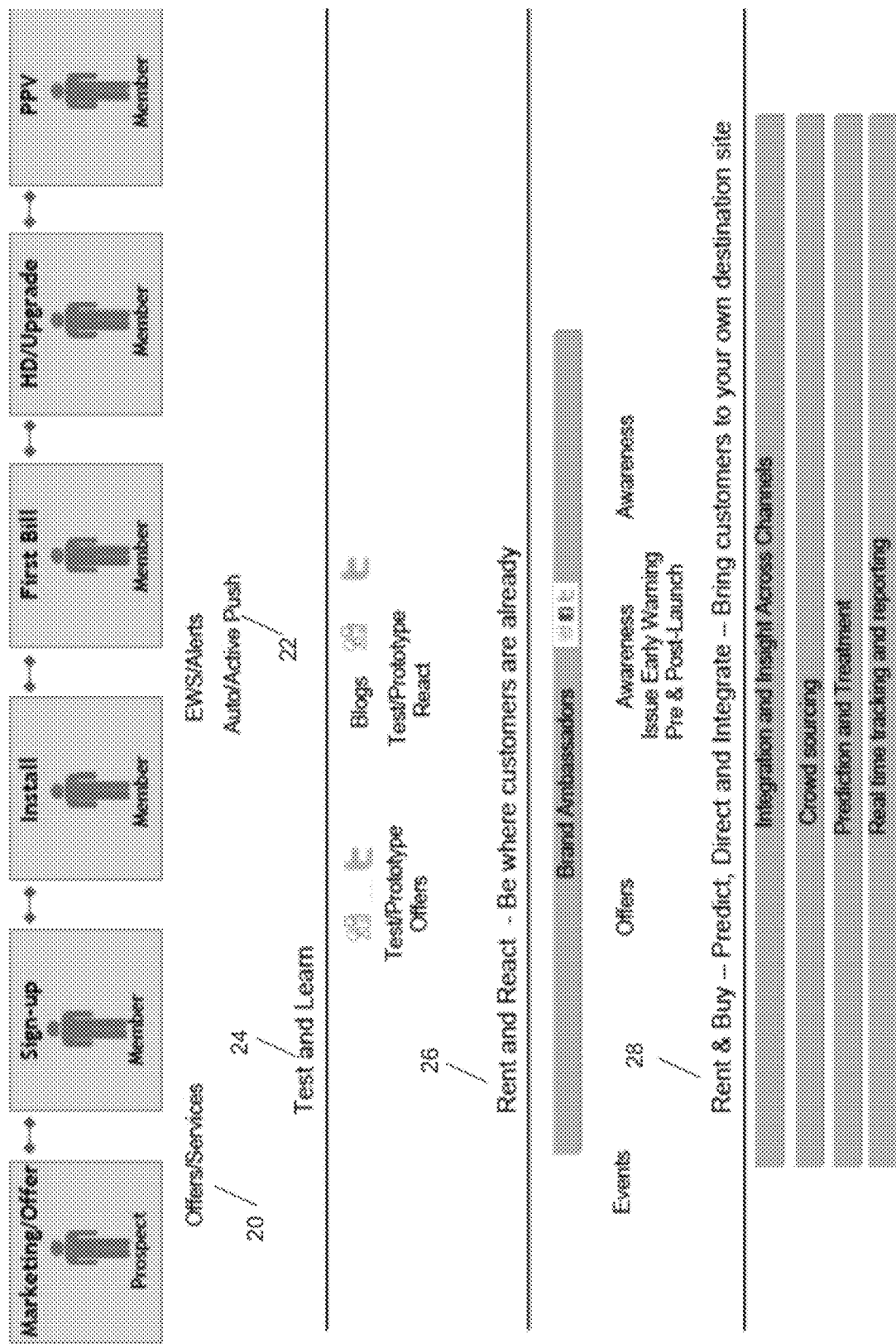
FIG. 2 is a block schematic diagram showing a social media strategy and, in particular, a customer life cycle according to the invention.

Embodiments of the invention provide techniques that quantize community interactions with social media to understand and influence consumer experiences. One embodiment is shown in FIG. 2, which is a block schematic diagram showing a social media strategy and, in particular, a customer life cycle according to the invention. In FIG. 2, the customer life cycle begins with offers/services 20 and proceeds through various stages of interaction between the customer and the merchant, where auto/active push provides EWS/alerts 22. This life cycle is accompanied by stages of merchant engagement with social media that include a test and learn stage 24 to develop a market approach; a rent and react stage 26 to place the merchant where customers are to be found, for example via brand ambassadors, where the merchant uses the herein disclosed invention to build authority, counteract negative sentiment and reinforce positive sentiment; and a rent and buy stage 28 where the merchant, in addition to the previous uses of the invention, uses the herein disclosed invention to predict, direct, and integrate customer actions and bring customers to the merchant's destination site, for example by integration and use of insight across channels, crowd sourcing, prediction and treatment, and real time tracking and reporting.

Figure 3:
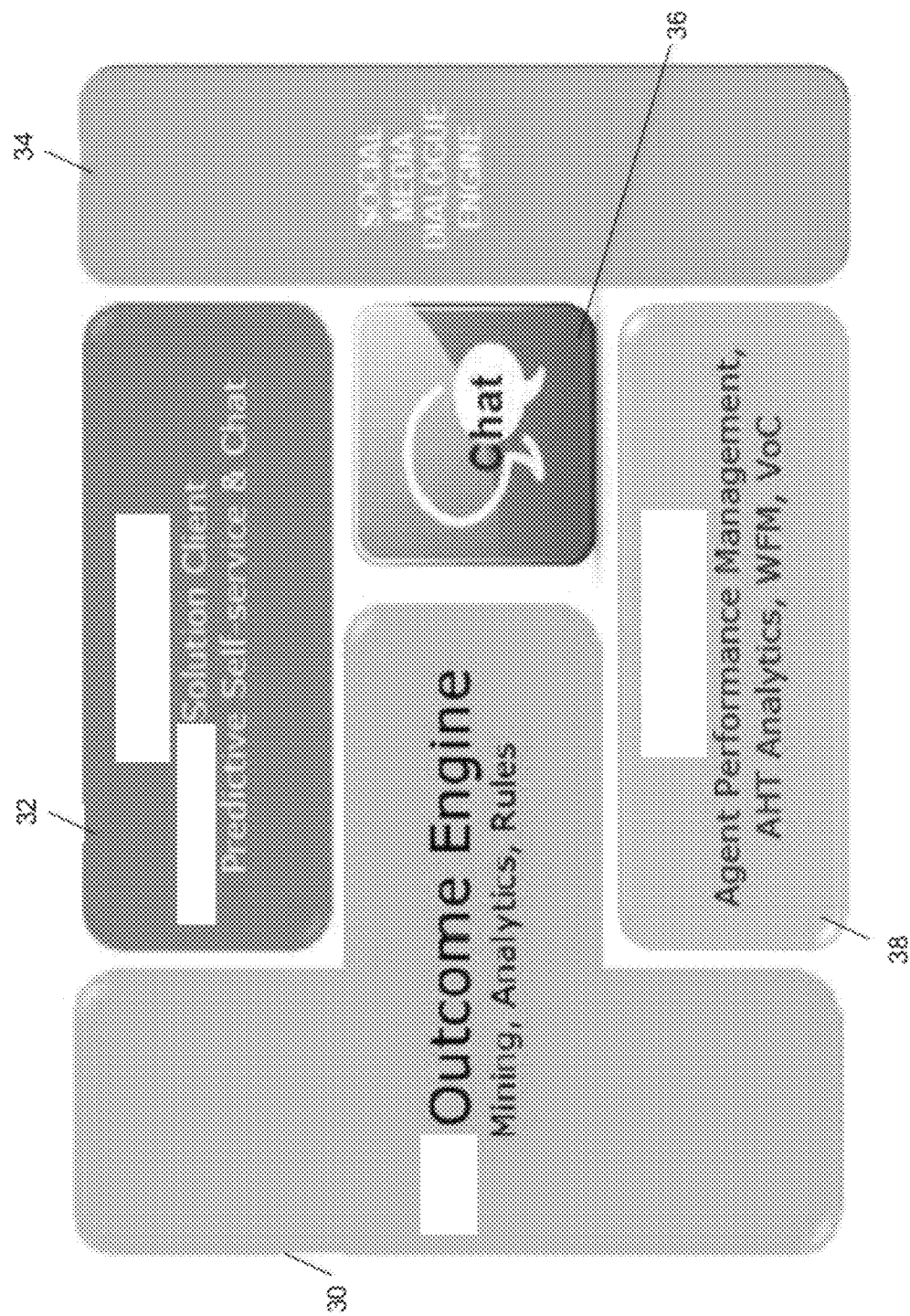
FIG. 3 is a block schematic diagram showing a customer predictive experience platform according to the invention.

FIG. 3 is a block schematic diagram showing a customer predictive experience platform according to the invention. The architecture of the platform shown in FIG. 3 provides social media brand improvement; blog, forum, site auto alert, and trigger; active auto sentiment management and rapid response; customer experience ticker; pre- and post-launch pulse; enhanced brand ambassadors; integration of live feeds; and social media dashboard. These functions are achieved in the platform by integration of an outcome engine 30 that is used for information mining, and that applies rule and analytics to such information; an ops module 38 that provides agent performance management, average handling time (AHT) analytics, WFC, and voice of the customer (VoC) facilities; a chat module 36; a social media dialog engine 34; and a solution client 32 that effects predictive self-service and chat.

Figure 4:
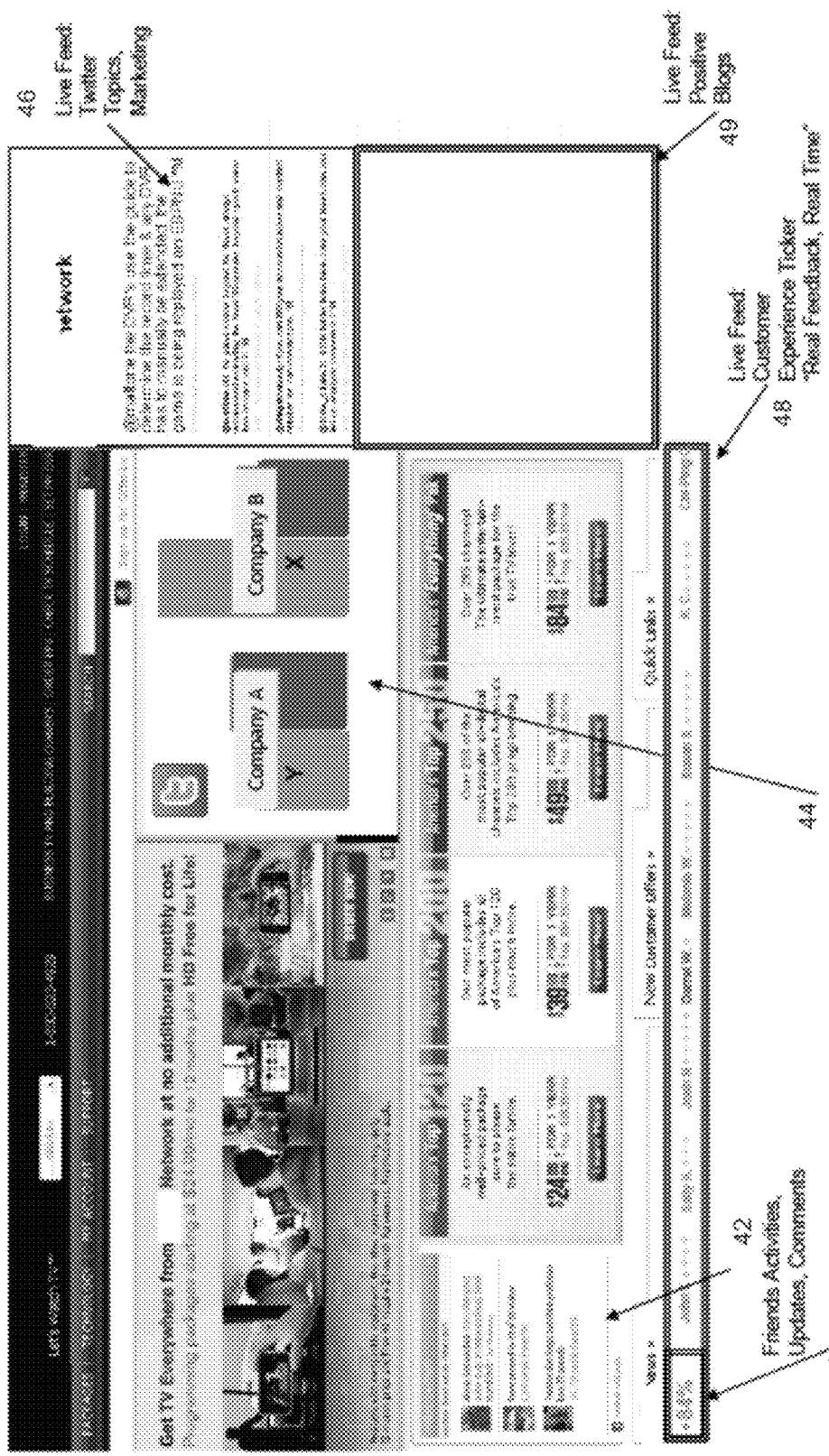
FIG. 4 is a Web page showing a live portal and, in particular, social media engagement and feedback according to the invention.

FIG. 4 is a Web page showing a live portal and, in particular, social media engagement and feedback according to the invention. FIG. 4 shows real time CSAT 40, i.e. Customer Satisfaction, which is a value that is extracted from a real-time survey score from customers receiving services (general or issue specific); friends activities, updates, and comments 42; real time sentiment comparison 44; live feed with regard to Twitter tweets, marketing 46; live feed 48 with regard to a customer experience ticker that provides real feedback in real time; and live feed 49 with regard to positive blogs.

The social media strategy for the above three stages of implementation is shown in FIG. 2 (24, 26, 28). In an embodiment, the steps for each strategy are as follows:

First stage 24: Try/participate, test, and prototype;

Second stage 26: Company and brand specific, dedicated brand ambassadors—reactive, standalone reporting, how to build the relationship with the social audience: rent vs. buy: sales vs. service; rent: on other sites; and buy: build vs. collect; and Third stage 28: Relationship deepening, create measurable business value with associated metrics: sales: acquisition, lead generation, and marketing, service: FCR, CSAT; automation in parallel and enhancing brand ambassadors; integrated into corporate messaging and marketing: two-way information exchange and synergy; leverage information flow between/across channels; unified view of content and state; actively manage and drive brand presence and value; integrated reporting; and figure out what is fit for social media and what is not fit.

Customer Sentiment

An embodiment of the invention provides for counteracting negative sentiment. In an embodiment, the platform identifies and specifically responds to negativity by generating an alert in a new thread; using text mining and targeting the issue; containing, limiting, and responding to the issue, including likes, and actively managing and recovering; and driving customer education and feedback learning and action.

The key steps are:

a) Identify negativity and trigger an alert to the platform for the threads that are negative;

b) Dig deeper and use the platform's text mining technology to identify the topic of the thread; and c) The key cause of the negativity as expressed by the writer.

d) The Influencer Score of the writer.

Then the platform;

e) Identifies best examples of feedback and real customer text from a database of positive recent customer transactions that are used to counteract the negative comments of the original writer.

Negativity identification and alert: an embodiment of the invention and the platform include an extensive database of words and phrases, as well as their context, that indicates a negative reaction by author of the text. The text is continuously scanned by a software monitor to look for words and phrases from the database. The platform has a set of trigger thresholds which are set initially based on historical data and then adjusted by real-time results and learning. If the amount of negativity text exceeds the threshold settings, then an alert is triggered. In addition, structured data, such as the number of likes, is integrated into the scoring. The word and phrase database is continuously renewed and the actual results are fed back to enable the platform to learn about the indicative power of each word and each phrase.

The platform also has a database of real customer transcripts which have positive experiences that is updated continuously and categorized in detail by topic. By presenting a large number of real examples from actual customer transcripts that are specifically matched to the topic in the negative thread, the platform can counteract and overturn the opinions expressed in the original negative thread just by the volume of positive opinions and experiences for the same issue.

An embodiment of the invention provides for reinforcing and amplifying positive sentiment and building authority. In an embodiment, the platform identifies and specifically responds to positivity by generating an alert in a new thread; using text mining and targeting the issue; reinforcing, amplifying, and highlighting the issue, including likes, and actively managing, growing and publicizing; and driving customer education and feedback learning and action and increasing authority.

In this embodiment, the key steps are:
a) Identify positivity and trigger an alert to the platform for the threads that are positive;
b) Dig deeper and use the platform's text mining technology to identify the topic of the thread; and
c) The key cause of the positivity as expressed by the writer.
d) The influencer score of the writer.
Then the platform;
e) Identifies best examples of feedback and real customer text from a database of positive recent customer transactions and these are used to reinforce positive comments, amplify volume and positive sentiment and build authority.

Figure 5B:
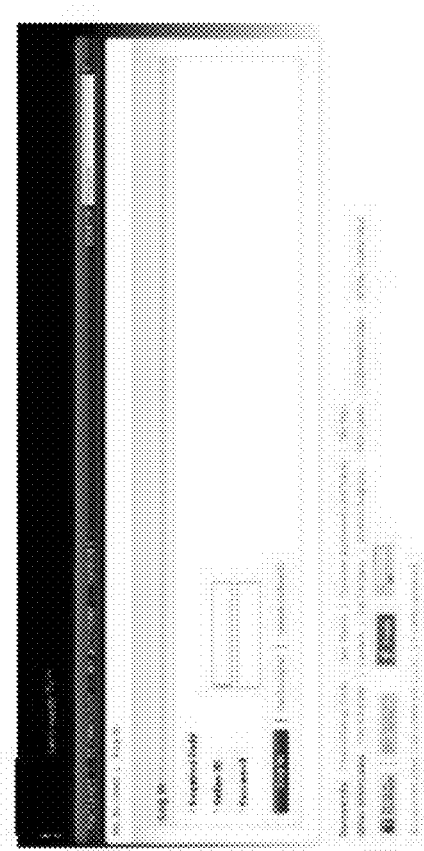
FIGS. 5A and 5B are screen shots showing old world (FIG. 5A) vs. new world (FIG. 5B) leveraging of online social persona.
Figure 5A:
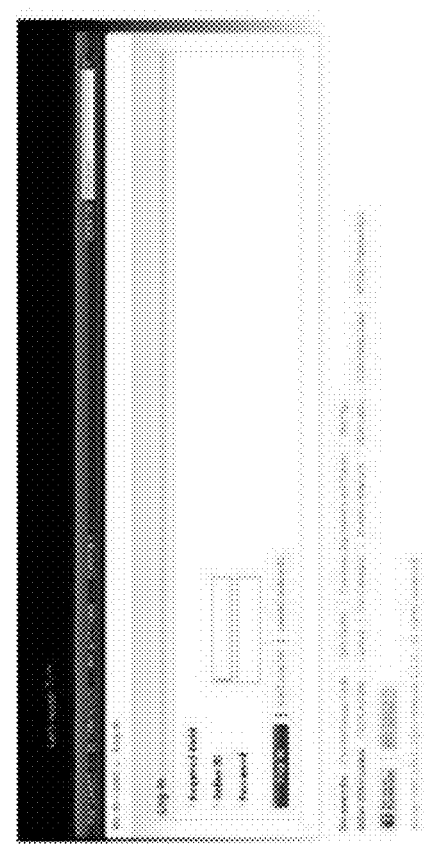

FIGS. 5A and 5B are screen shots showing state of the art (FIG. 5A) vs. novel (FIG. 5B) leveraging of online social persona. In the state of the art view, the Web is a communication channel. In contacting the customer, the platform captures email addresses that are collected through an active campaign. In the novel view, the customer has a Web presence. The platform is concerned with capturing the customer's experiences by any of leveraging and/or activating a Facebook login session; leveraging and/or activating a Twitter ID; capturing a Facebook name and Twitter ID; and collecting information through an active campaign.

Figure 6:
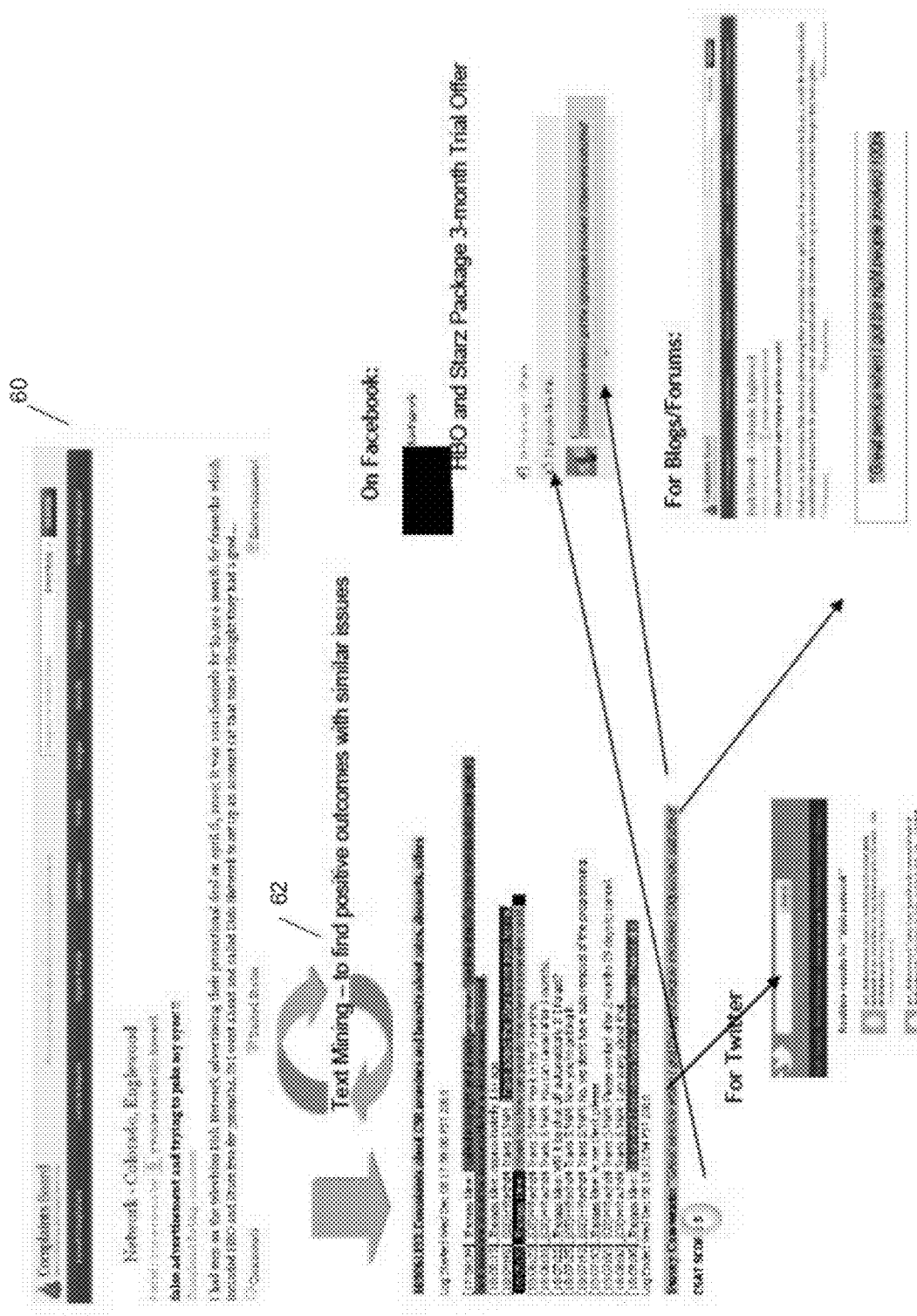
FIG. 6 provides a flow diagram that shows active management in a free included service according to the invention.

For example, FIG. 6 provides a flow diagram that shows active management in a free included service according to the invention. From a complaints board 60, an embodiment of the invention performs text mining 62 to find positive outcomes for similar issues, which are then used in social media, such as Twitter, Facebook, and/or blogs/forums. An embodiment of the invention incorporates the full range of automated text analysis techniques, including word spotting, key word and phrase, semantic context, subject and phrase categorization, and frequency distributions. These text mining techniques enable the platform to determine the intent and subject of each sample of text and enables the platform to organize the data into specific recommendation and insights.

Figure 7:
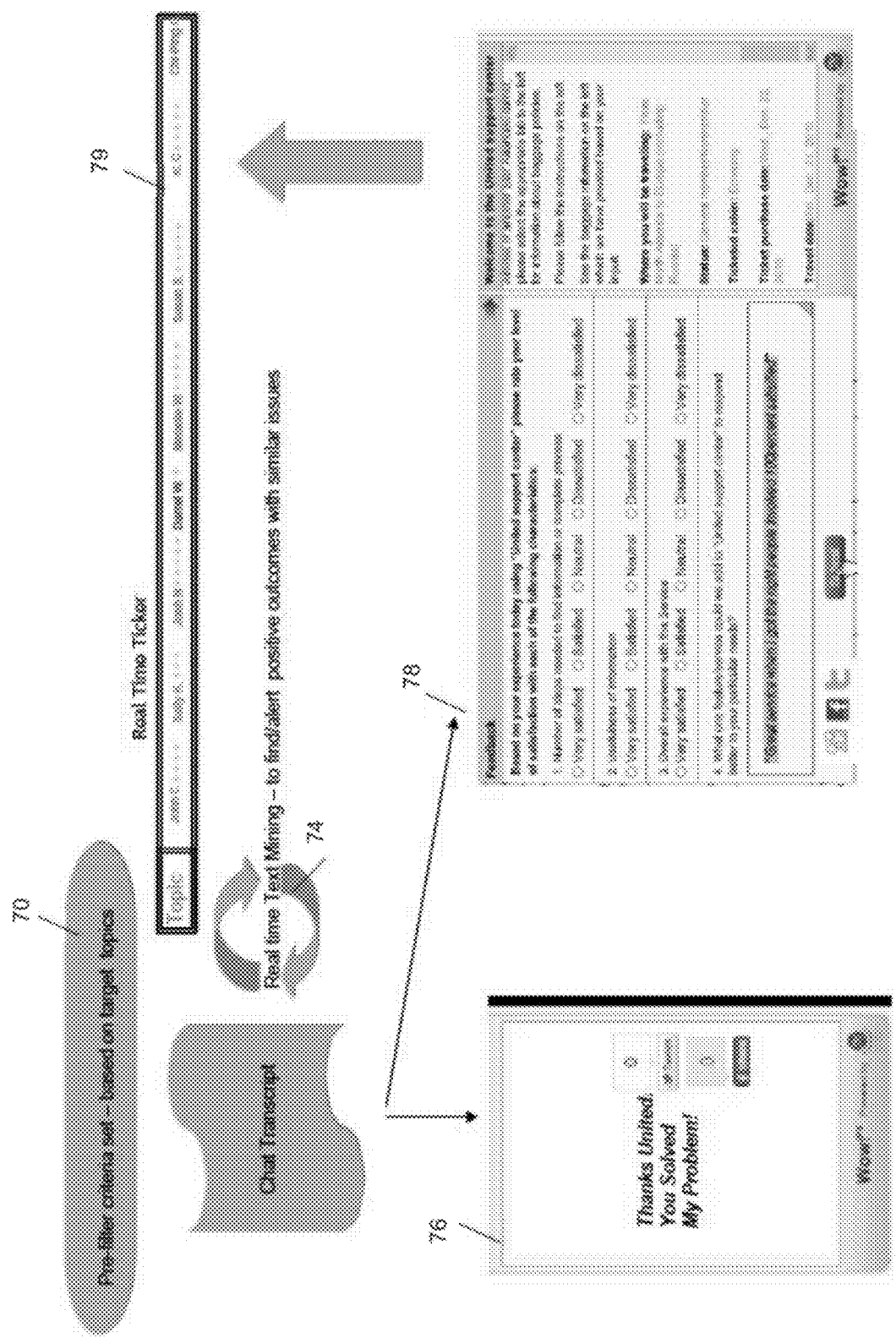
FIG. 7 provides a flow diagram that shows a Facebook, Twitter, and/or Digg session that is triggered directly from a chat exit survey according to the invention.

In another example, FIG. 7 provides a flow diagram that shows social media threads, such as a Facebook, Twitter, and/or Digg session, that is triggered directly from a chat exit survey according to the invention. Pre-filter criteria are set, based upon target topics 70. In an embodiment, the key criteria are established two ways: either specifically by the end user based on the current business priorities; or automatically by the platform and the invention as it monitors the different social media threads combined with positive score levels. Example criteria are sessions or topics or situations that match a key topic the user of the platform wants to emphasize or specific sound bites and feedbacks that are impactful. The chat transcript is obtained 72 and real time text mining is performed 74 to find/alert positive outcomes with similar issues. Positive feedback is received 76 and may be input to a survey 78 which then feeds a real time sentiment ticker 79. The real time scores from real time live customer service interactions are extracted by a software filter and passed using Web services to a software engine within the platform that tracks and accumulates each score and posts it to the ticker.

Figure 8:
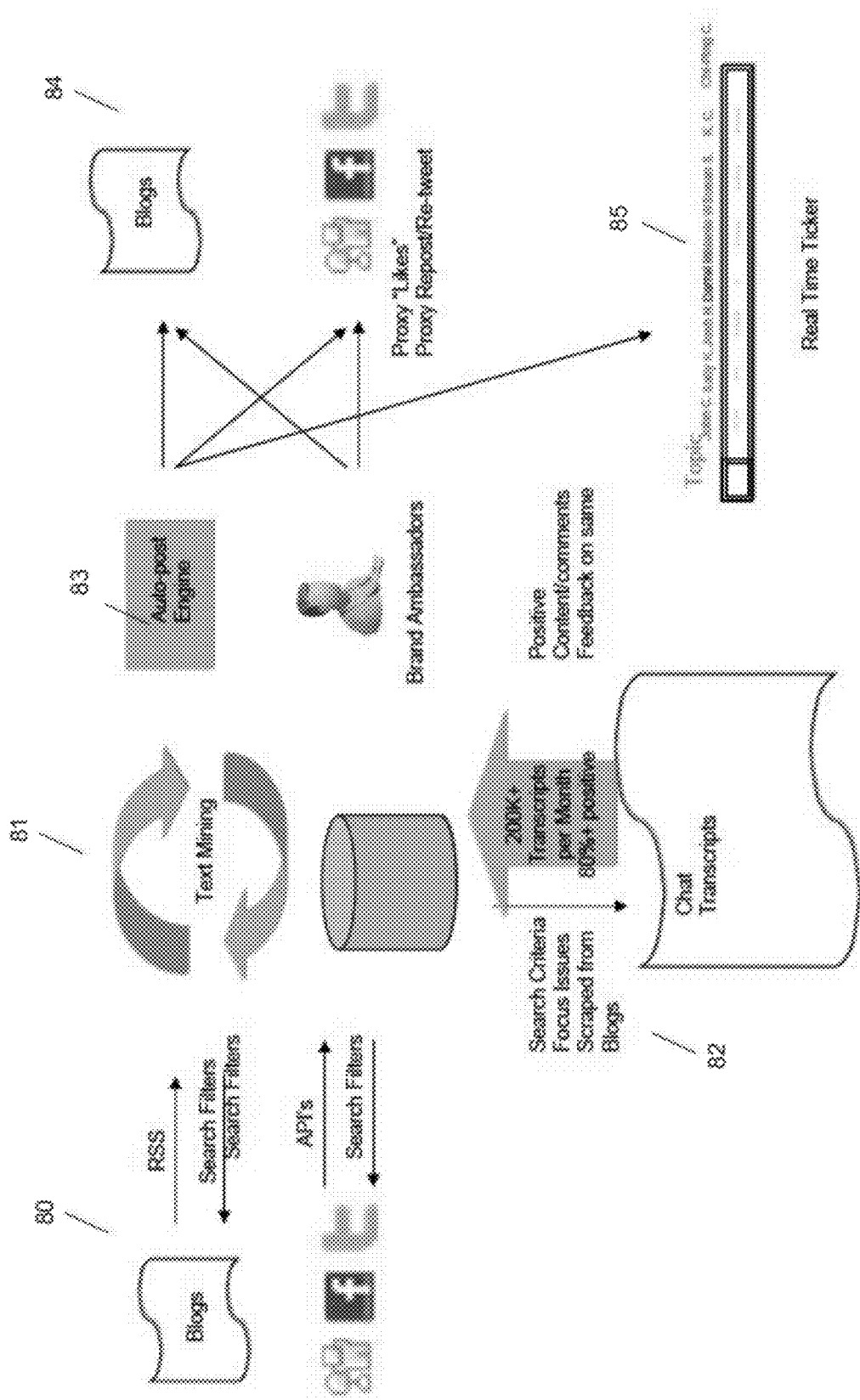
FIG. 8 provides a flow diagram that shows a social media rapid response and positive influence system in connection with an active positive sentiment according to the invention.

In a further example, FIG. 8 provides a flow diagram that shows a social media rapid response and positive influence system in connection with an active positive sentiment according to the invention. In FIG. 8, information from social media 80, such as RSS feeds and search filters to/from blogs, and APIs and search filter to/from such social media as Facebook, Digg, and Twitter, is applied to a text mining engine 81. Search criteria is used to focus issues scraped from blogs, for example, with regard to chat transcripts 82. In one embodiment, the text mining engine within the platform is a software engine that automatically applies these techniques to all of the customer interaction transcripts in real-time.

An auto-post engine 83, which (in an embodiment) is a software engine that interfaces with the transcript database and the social media platforms, extracts the key posts and segments from the transcript databases and posts them into the social media platforms through the standard API which uses the results obtained, including input from brand ambassadors, i.e. customers who have great customer experiences and provide the feedback into transcripts and surveys reflecting the great experiences, and positive content/comments as feedback on such issues to post, to disperse such processed information to influence customers in social media environments 84, such as blogs and services, such as Facebook, Digg, and Twitter (as discussed above, by finding the relevant good segment in the transcript, matching it to the social media topic that is being targeted, and then posting it to social media using its common API or web services); as well as to drive a real time sentiment ticker 85 (as discussed above, where the ticker shows real time customer survey scores and is extracted from the database of surveys and posted to the website ticker via Web services) for use for merchant and marketing groups in connection with the current customer issue.

Figure 9:
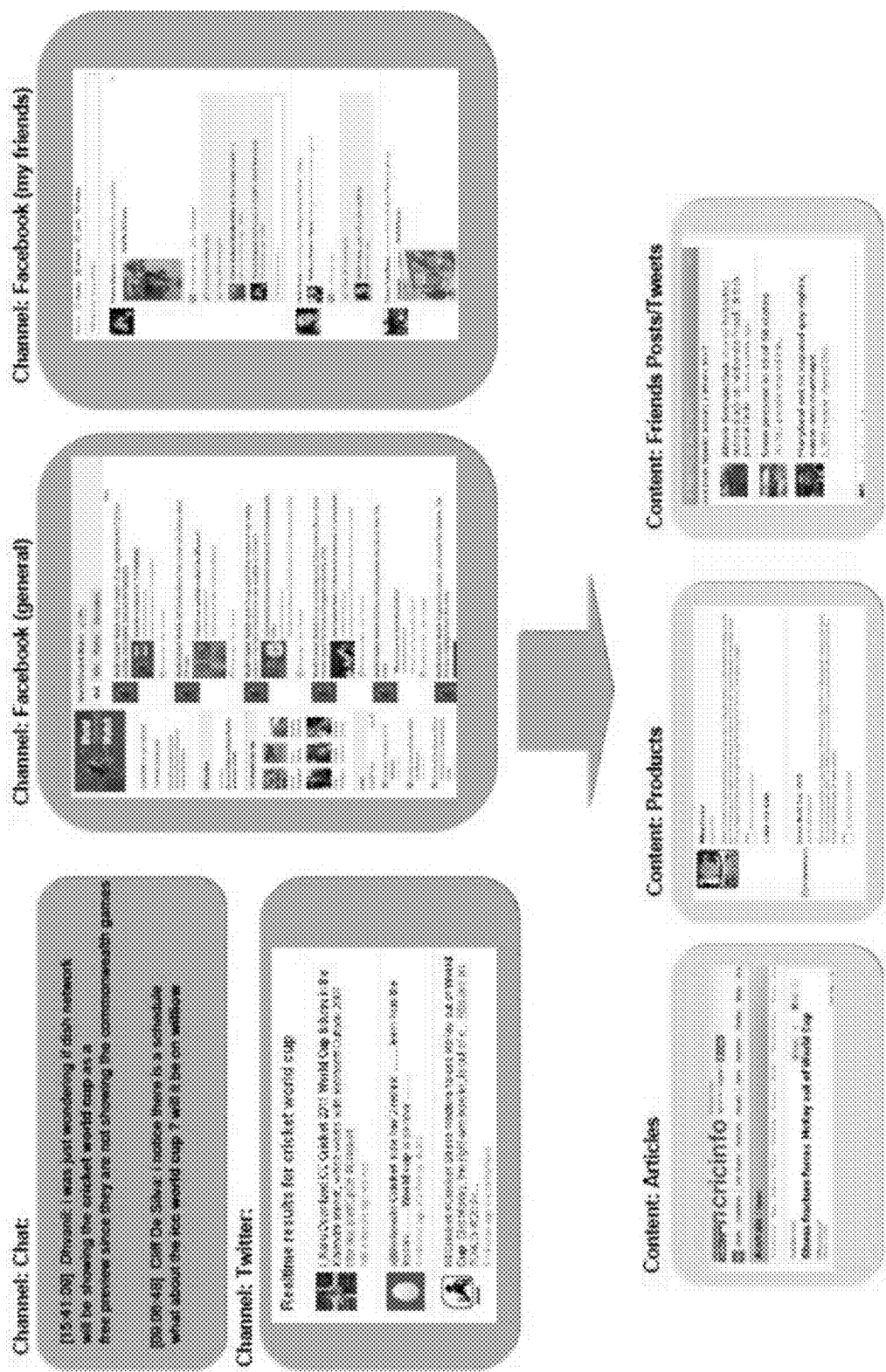
FIG. 9 is a flow diagram that shows curated content triggered by social dialogue according to the invention.

FIG. 9 is a flow diagram that shows curated content, which is triggered by first organizing, segmenting, and creating content bundles and then associating key words and phrases to predictive indicators and triggers. Once the platform finds the trigger in the channels, it then presents the corresponding curated content. This content is triggered by social dialogue according to the invention. Curated content is that which one can buy/collect from a destination site via any of feeds from other sites, text mining, and spidering to find associated content; and crowd source ratings on content that are used to determine the most relevant/best to pull into customer Web page. For example, possible site themes can include cricket, boxing, and/or Bollywood.

Pre- and Post-launch Early Warning/Trending/Triggers

Figure 10:
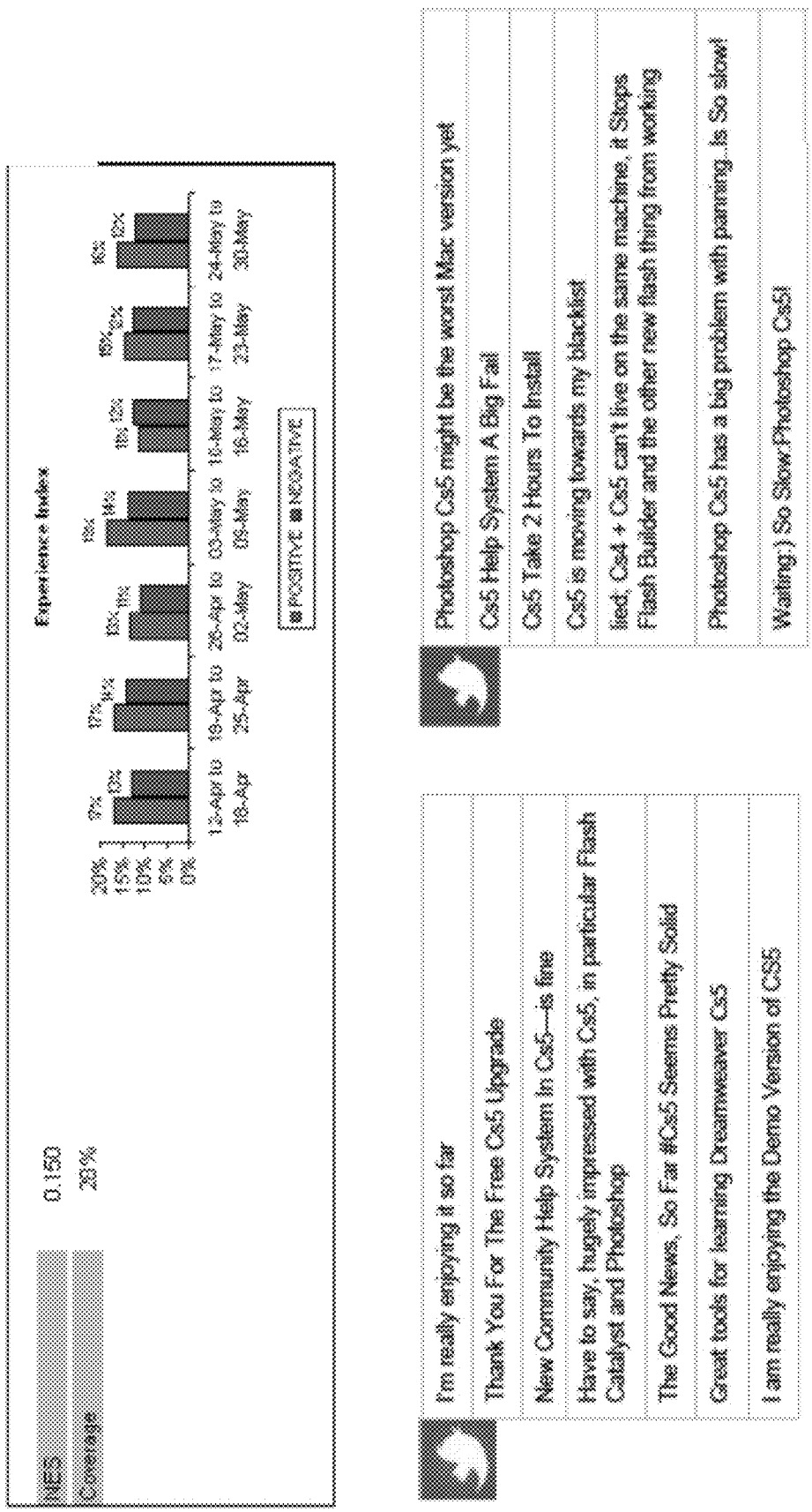
FIG. 10 is a report that shows CS5 Buzz on Twitter according to the invention.

FIG. 10 is a report that shows CS5 Buzz on Twitter according to the invention (Source: 1770 tweets collected on CS5 for 24th May to 30th May). Both positive and negative Tweets are tracked and comments are separated and presented in lists accordingly.

Figure 11:
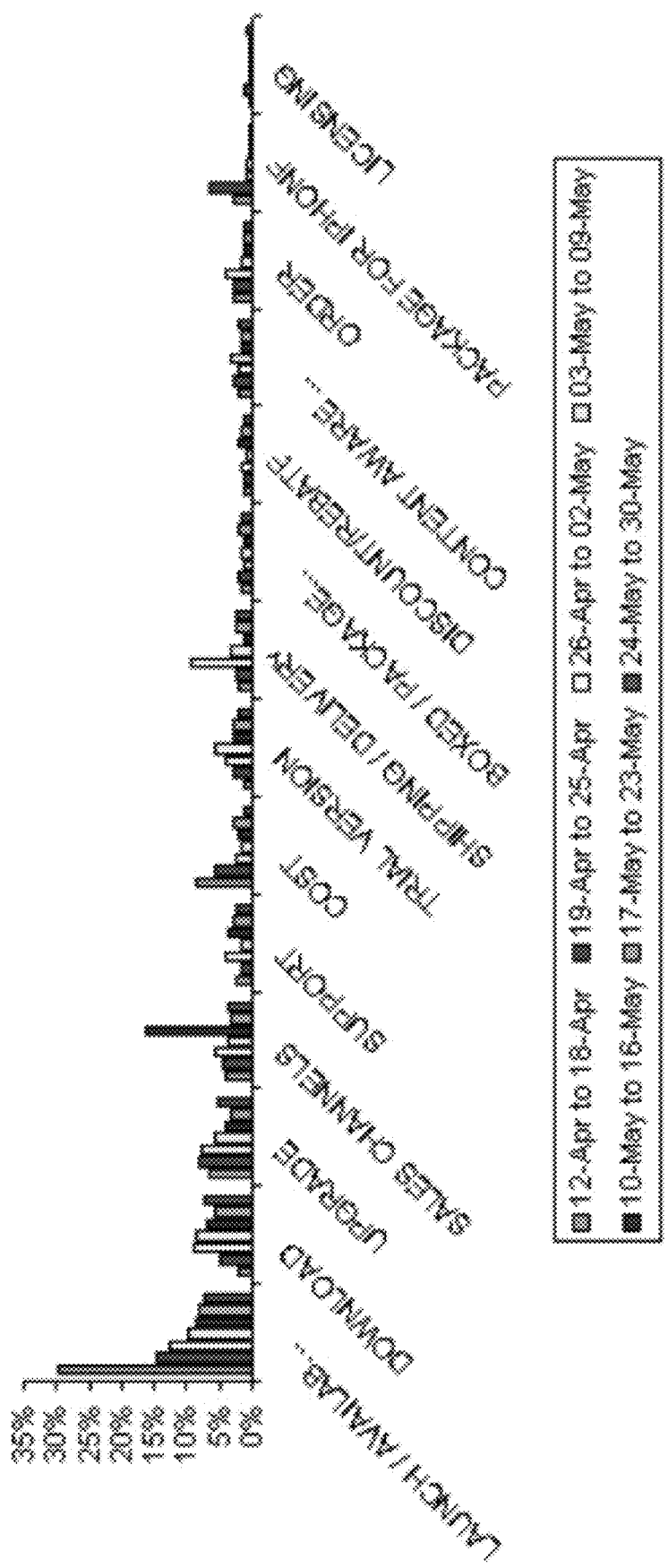
FIG. 11 is a chart that shows categorization of CS5 Buzz on Twitter according to the invention.

FIG. 11 is a chart that shows categorization of CS5 Buzz on Twitter according to the invention (Source: 1770 tweets collected on CS5 for 24th May to 30th May). In the chart of FIG. 11, customer sentiment is categorized based on topic, but other categorizations are possible within the invention, for example based upon demographics or source of customer input. The possible list of categorizations are not limited and are based on the different topic lists that can be extracted from text mining.

Figure 12:
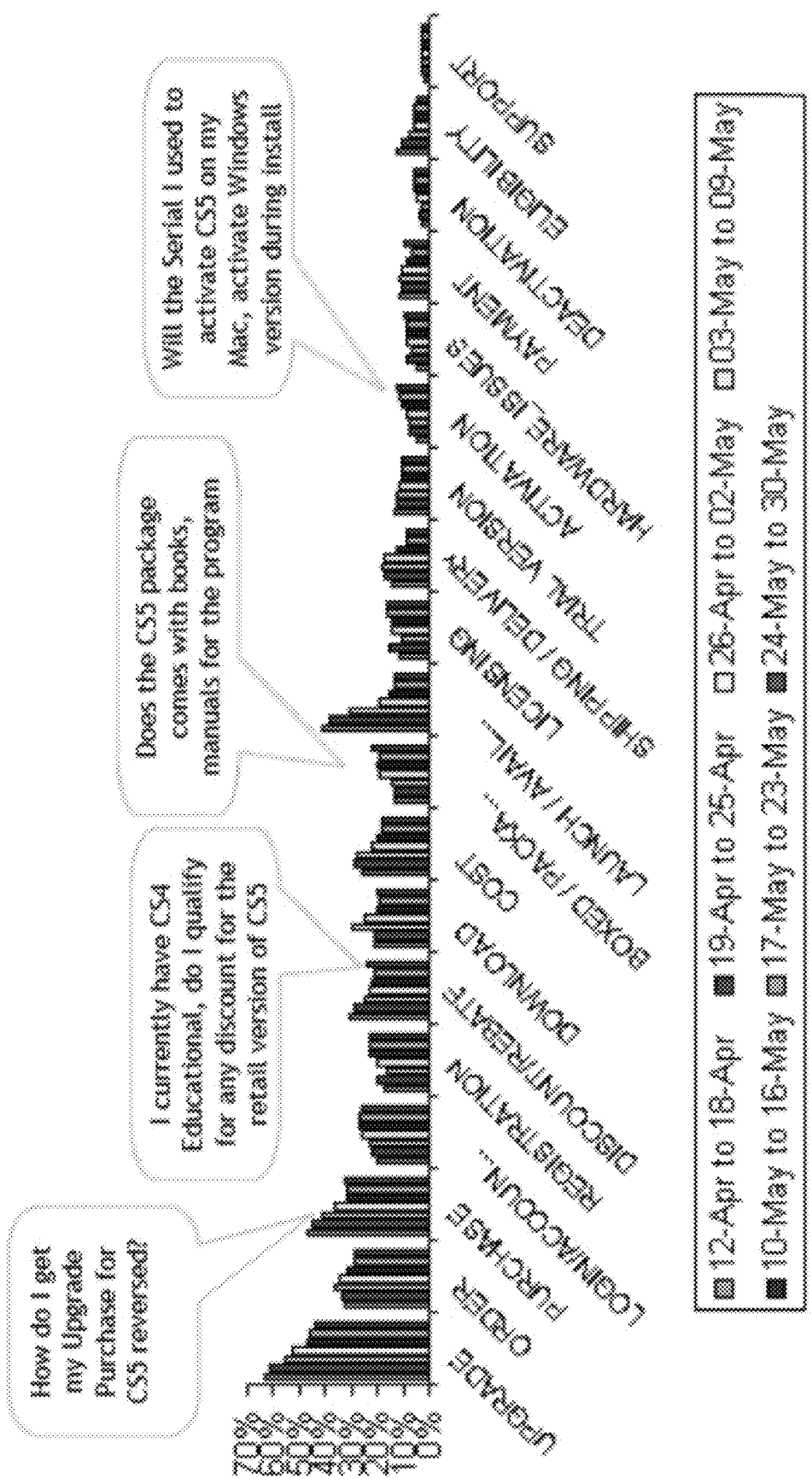
FIG. 12 is a chart that shows post launch text mining on chat interaction for CS5 according to the invention.

FIG. 12 is a chart that shows post launch text mining on chat interaction for CS5 according to the invention. For purposes of the discussion herein, an interaction can have multiple issues being talked about, hence the values in FIG. 12 have a total greater than 100%. As can be seen in FIG. 12, trends over time are readily discerned, including the most frequent topics, the relative magnitude over the different date ranges, as well as customer interest in any particular topic.

Figure 13:
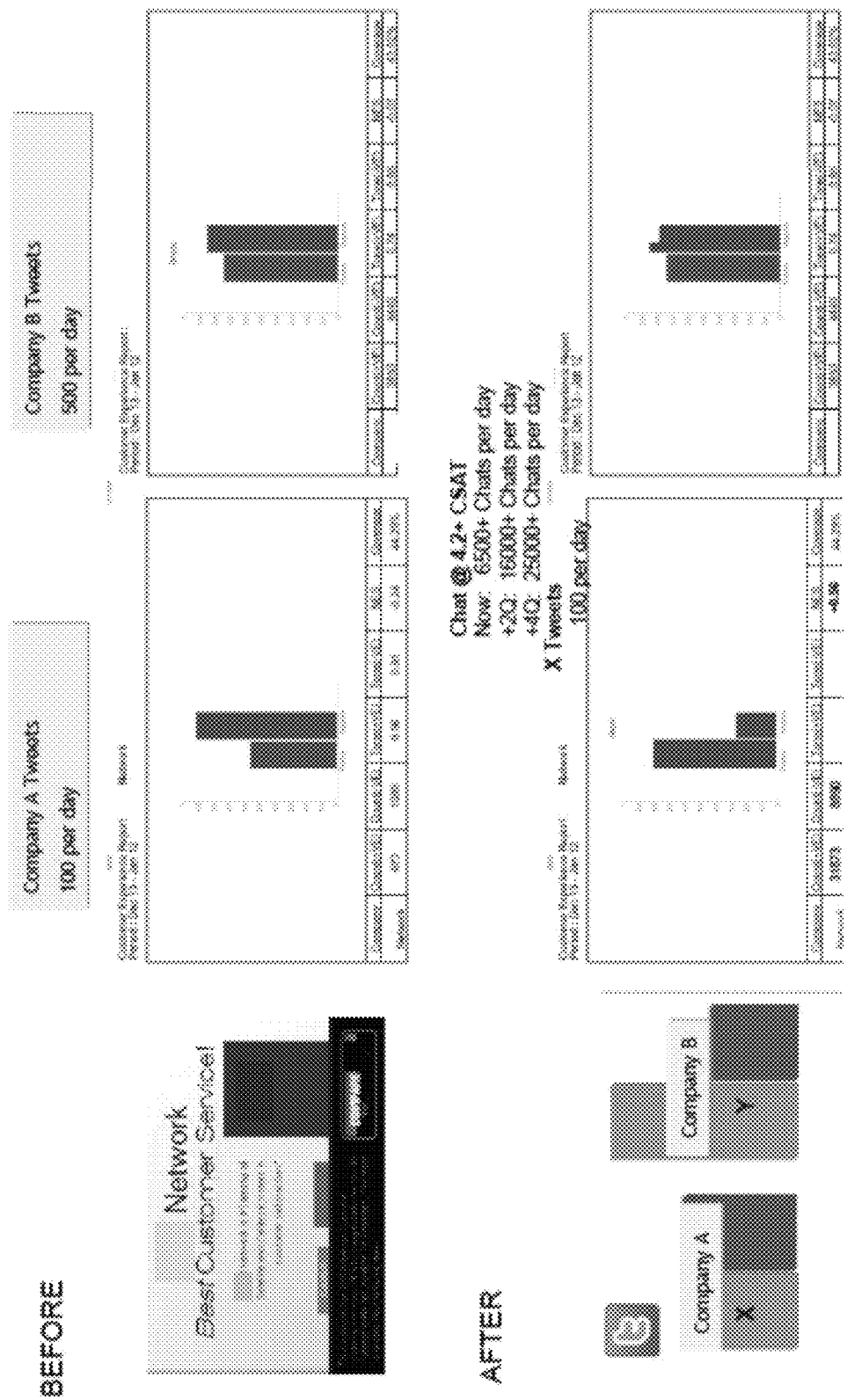
FIG. 13 provides a series of before and after graphs that show the impact of reinforcing the customer experience according to the invention.

FIG. 13 provides a series of before and after graphs that show the impact of reinforcing the customer experience according to the invention. Before the application of the invention, negative sentiment, and thus the impression of the company, is 1.5× more negative than positive; whereas after, the trend has been pushed to over 3× positive relative to negative.

Social Media Mining for Customer Service

Figure 14:
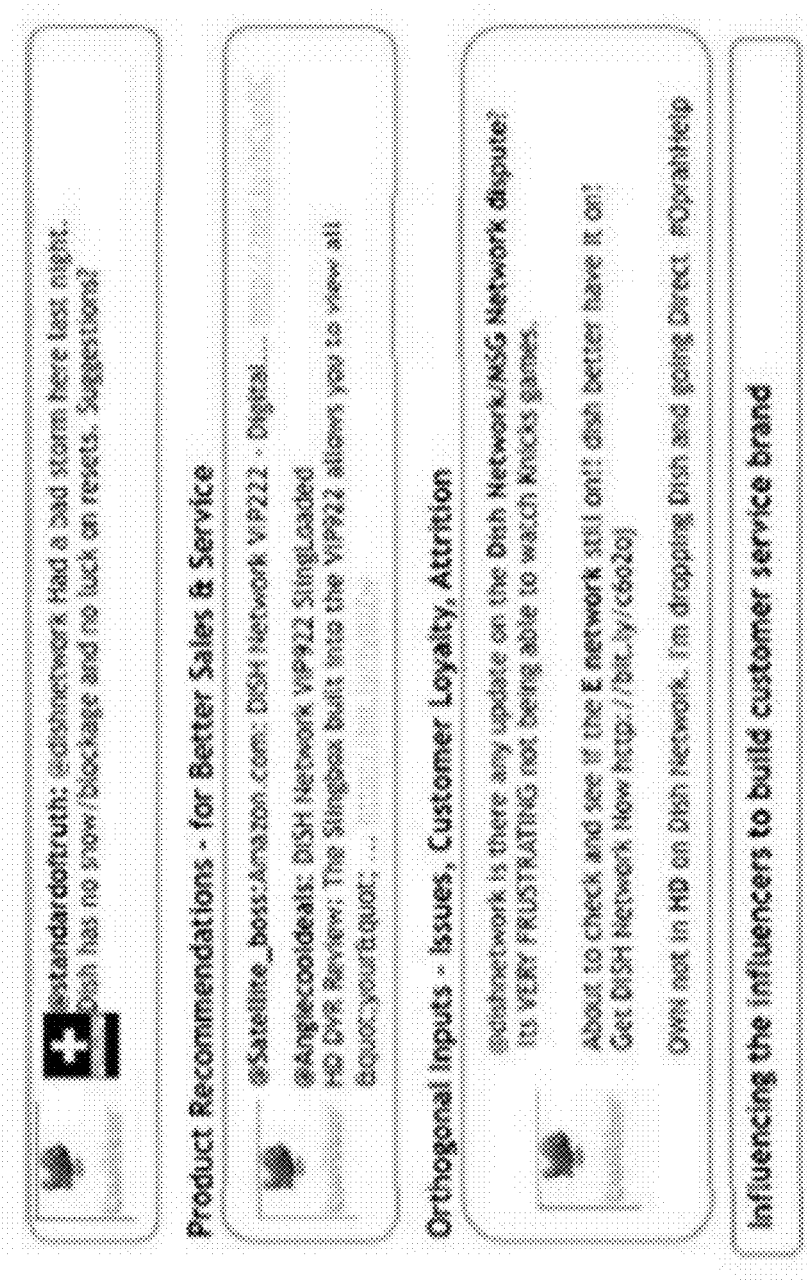
FIG. 14 illustrates a tweet on the Dish service, a tweet containing a product recommendation to produce better sales and service, a tweet showing orthogonal inputs regarding issue, customer loyalty, and attrition, all to influence the influencers to build a customer service brand.

Social media provide a communications medium, for example as provided by Twitter. In an embodiment of the invention, analysis of posts on such media are used in customer service and other organizations to improve brand and customer experience. For example, see FIG. 14, which provides a tweet on the Dish service, a tweet containing a product recommendation to produce better sales and service, a tweet showing orthogonal inputs regarding issue, customer loyalty, and attrition, all to influence the influencers to build a customer service brand.

Social Media as a Leading Indicator for Customer Service

An embodiment of the invention concerns mining social media to determine leading indicators of issues that pop up in other channels. For example, a Twitter tweet can provide an early indication of a service issue that hits the call center or other contact channels.

Pre-Interaction—Social Media for predicting Leading Indicators

Figure 15:
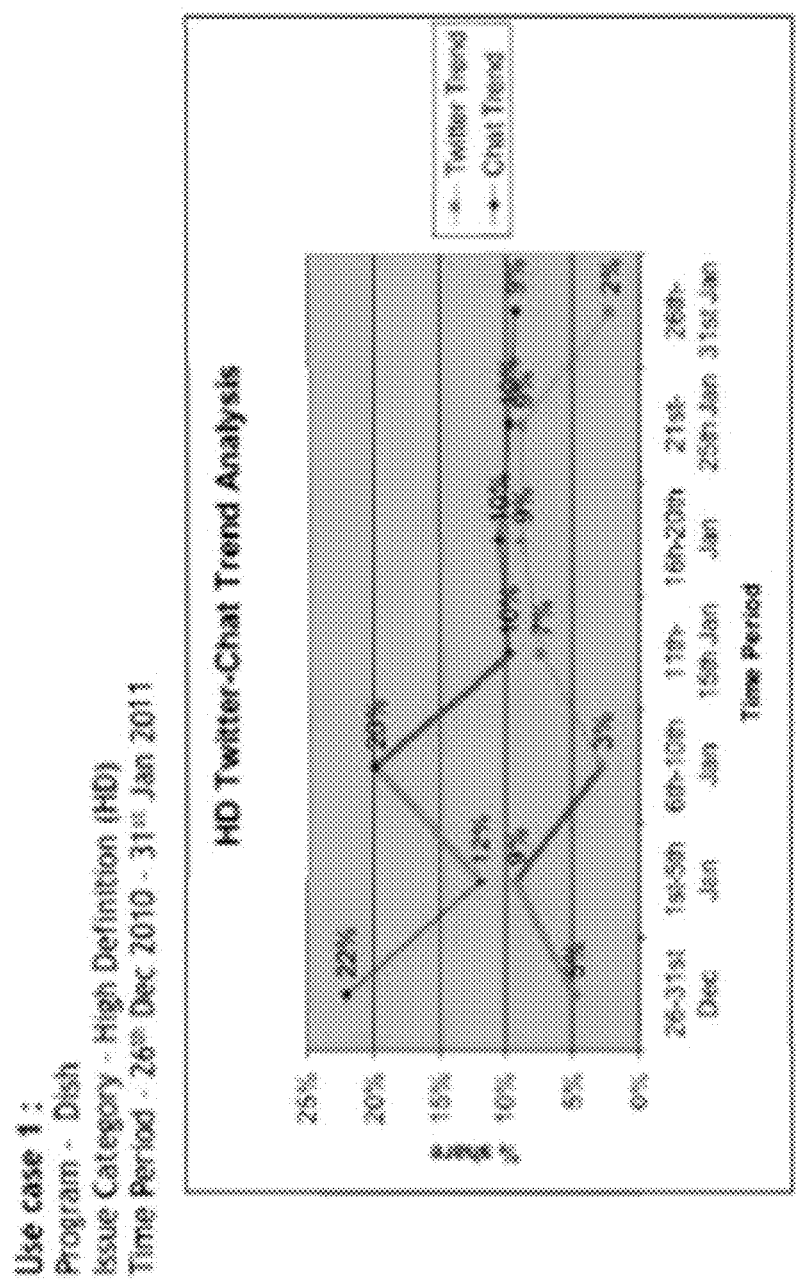
FIG. 15 is a trend analysis of Use Case 1.

FIG. 15 is a trend analysis of Use Case 1, in which the Twitter trend shows that issues around HD trend upward from 5% ($26^{th}$-$31^{st}$ Dec) to 9% ($1^{st}$-$5^{th}$ Jan). The chat trend follows this, with a one-week lag, going from 12% ($1^{st}$-$5^{th}$ Jan) to 20% ($6^{th}$-$10^{th}$ Jan). The downward Twitter trend thereafter is followed by a downward chat trend. The time lag in this case is one week, but this is a function of the issue type, channel, customer type, and other attributes of the company, issue, and customer. This embodiment of the invention recognizes that media, such as Twitter, is a leading indicator for slower media, such as chat. Thus, social media, such as Twitter, provides a leading indicator that can be used to predict trends. In the case of a call center application, the leading indicator detected in Twitter tweets can be used to predict an increase in call center activity around a particular issue. Thus, social media is used to identify a spike in activity, identify questions around the spike, determine a trend and, in a call center application, plan staffing and plan a response in advance.

Impact of Influencing Influencers in Social Media to Manage Opinion and Brand

Influencers in Social Media—Example. Who are the key influencers in Twitter for Dish and what are they talking about? In another embodiment, in addition to leading indicators, key influencers may be identified from social media. Once key influencers are identified, it is advantageous for a marketing or other organization to reach out to them, for example as part of customer care. In this way, it is possible to influence an influencer. For example, a customer may complain on Twitter that a company, such as AT&T, is unresponsive. The company sees the tweet and calls the customer to resolve the issue. Thus, proactive customer care can be provided.

How Do We Identify Them?

Influencers—Scoring Model. In this embodiment, an organization tracks the top influencers in a community on a social medium, such as Twitter. The organization uses various tools to measure customer sentiments and then reaches out to the customers if there is a negative trend. Thereafter, a successful resolution message may result in a positive sentiment in the social media that creates a positive trend. The score itself is aggregated up as a weighted average at each level in the hierarchy of the tree.

Influencers in Social Media—Example. Who are the key influencers in Twitter for Dish and what are they talking about? In another embodiment, in addition to leading indicators, key influencers may be identified from social media. Once key influencers are identified, it is advantageous for a marketing or other organization to reach out to them, for example as part of customer care. In this way, it is possible to influence an influencer. For example, a customer may complain on Twitter that a company, such as AT&T, is unresponsive. The company sees the tweet and calls the customer to resolve the issue. Thus, proactive customer care can be provided.

A customer or a member of the customer community may be seen as an influencer, however an authority, either a customer or a company, in addition to being an influencer, encompasses the additional characteristics of history of expertise and ability to identify good/optimum solutions to situations. To both identify authorities further and specifically to enable a strategy for the company to build-up its own ability to be an authority proactively, a company can have a predictor model that is similar to that of the influencer, with many of the same common attributes, such as activity, average sentiment, reposts, etc. The relative importance of these attributes, i.e. the weights, could be different. A key attribute of authority is thus the authority's ability to influence influencers in social media. In this embodiment, there is a beneficial link and relationship between authority and influence. For example, because components such as authority and number of relevant posts are impactful, they are useful to create influence on the part of the authority and build an influencer score. Another key attribute of authority is the ability to deliver accurate data, information, insight, and guidance relevant to a situation or scenario.

For example:

$$\text{Trust Score} = w_1(\text{agreement}) + w_2(\text{Opposition}) + w_3(\text{retweets}) + w_4(\text{References}).$$

In this manner, it aggregates up to an influencer score. The weights themselves are optimized based on manual ranking of the influencers that act as constraints for the optimization problem. Each of these scores is a numerical sum of instances of that particular attribute. For example, if ten tweets were in agreement with a tweeter. Then the agreement score is ten. Scores themselves are finally normalized to the average number of tweets from tweeters in that population.

Figure 16:
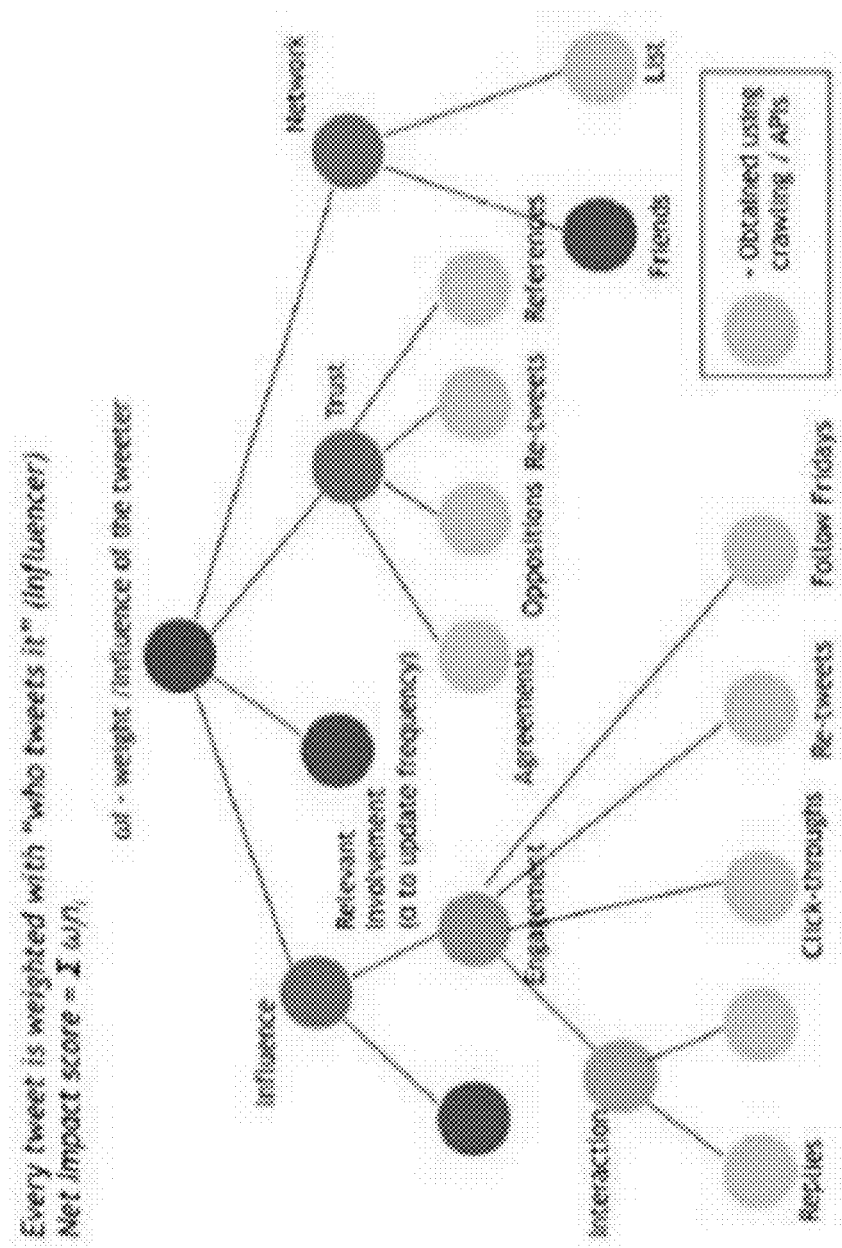
FIG. 16 is a block schematic diagram that shows one model for scoring influencers according to the invention.

FIG. 16 is a block schematic diagram that shows one model for scoring influencers according to the invention. In FIG. 16, every tweet is weighted based upon the influence of the person making the tweet. This yields a net impact score. The factors that make up this influence are shown on FIG. 16 and include such factors as engagement, trust, and the tweeter's network (details provided above).

Top Influencers Computation

Figure 17:
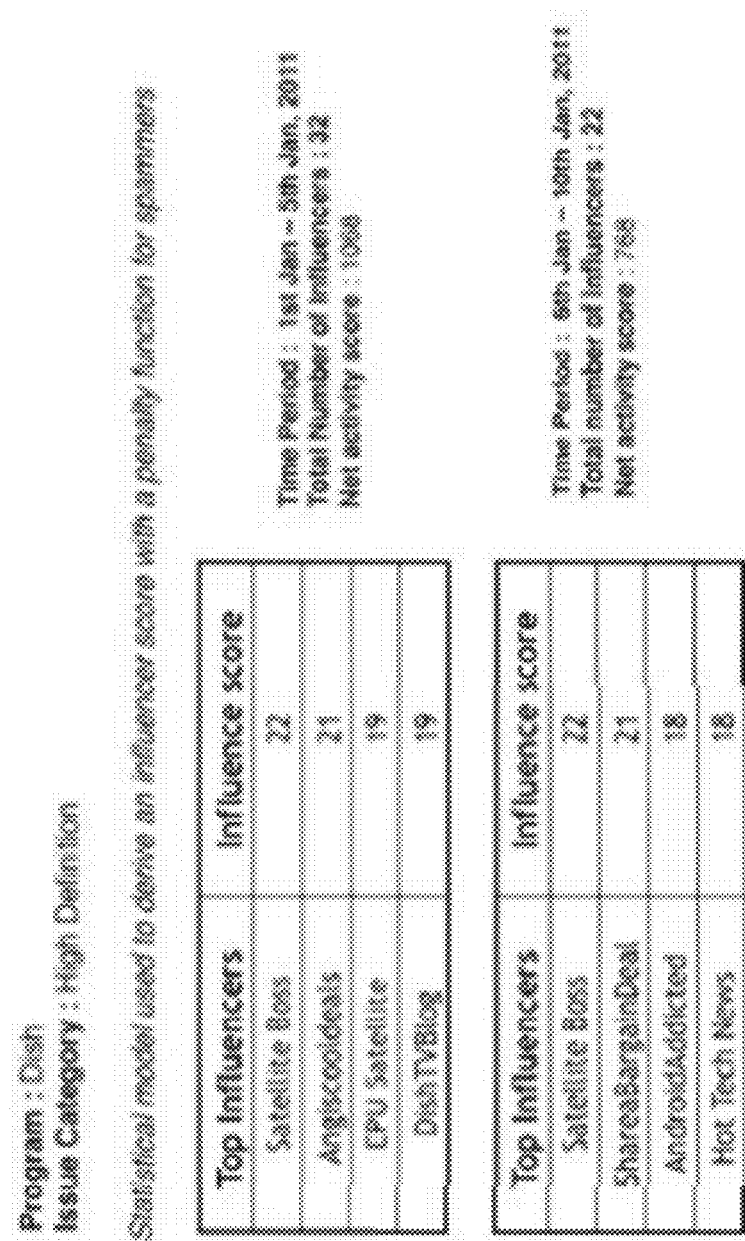
FIG. 17 illustrates how an influencer exerts influence over others.

For example, consider the organization Dish with regard to the issue of HD, as shown in FIG. 17. In FIG. 17, the top influencers are ranked with those having the highest influence score ranked highest. It can be seen that influence changes over time. For example, the time period $1^{st}$ Jan -$5^{th}$ Jan shows a different ranking than the time period $6^{th}$ Jan -$10^{th}$ Jan. The details are given above. In this particular case, the weights are all 1.

Influencers and their Influences

Figure 18:
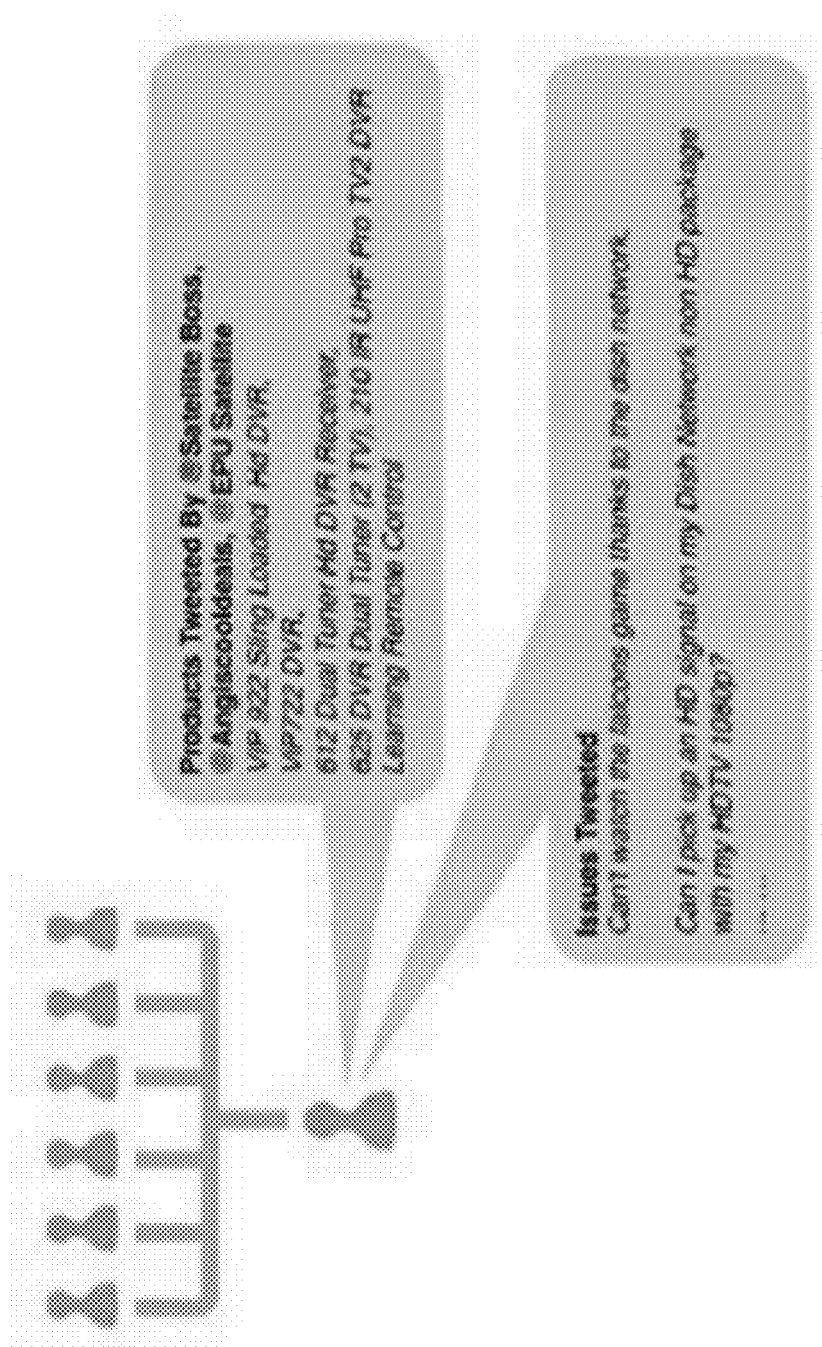
FIG. 18 illustrates an embodiment that identifies influence and provides an organization with a path to remediation of the influencer's issues that creates a net media positive trend in social.
Figure 19:
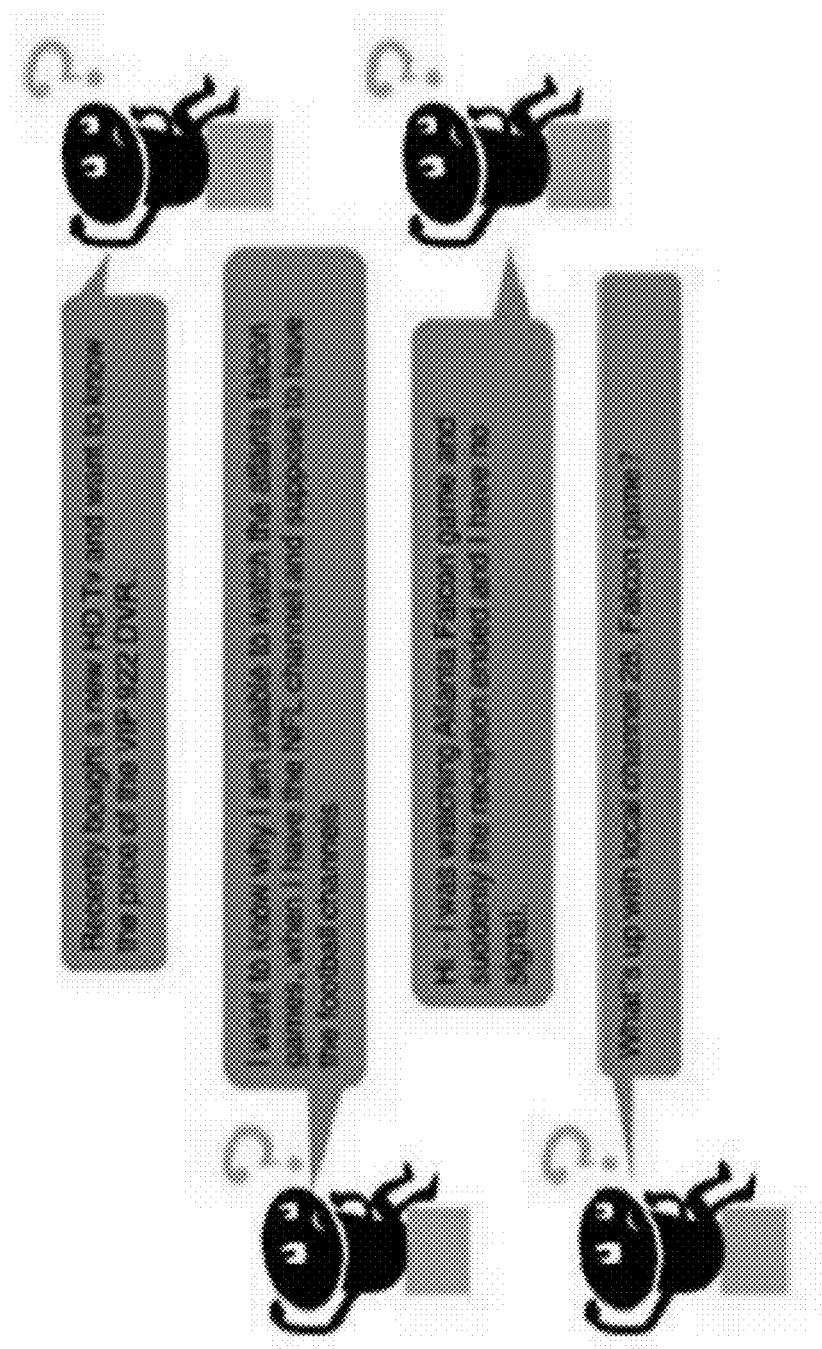
FIG. 19 illustrates a Chat Analysis for 6-10 Jan, 2011—HD related.

In the example of FIG. 17, an influencer exerts influence over others. An embodiment identifies this influence and provides an organization with a path to remediation of the influencer's issues that creates a net media positive trend in social media. See FIG. 18, in which top ranked Satellite Boss (see FIG. 17) tweets his dissatisfaction with Dish HD. Now, consider a Chat Analysis for 6-10 Jan, 2011—HD related (see FIG. 19). This embodiment uses social media to identify leading indicators, identifies key influencers, and uses this knowledge to respond preemptively, either through the key influencer and/or through preparing for an impending issue. The key issues are identified using topic models or issue categorization models that have been described in U.S. patent application Ser. No. 12/604,252, attorney docket no. 247C0007, which application is incorporated herein in its entirety by this reference thereto.

Incorporating Social Media Inputs

Figure 20:
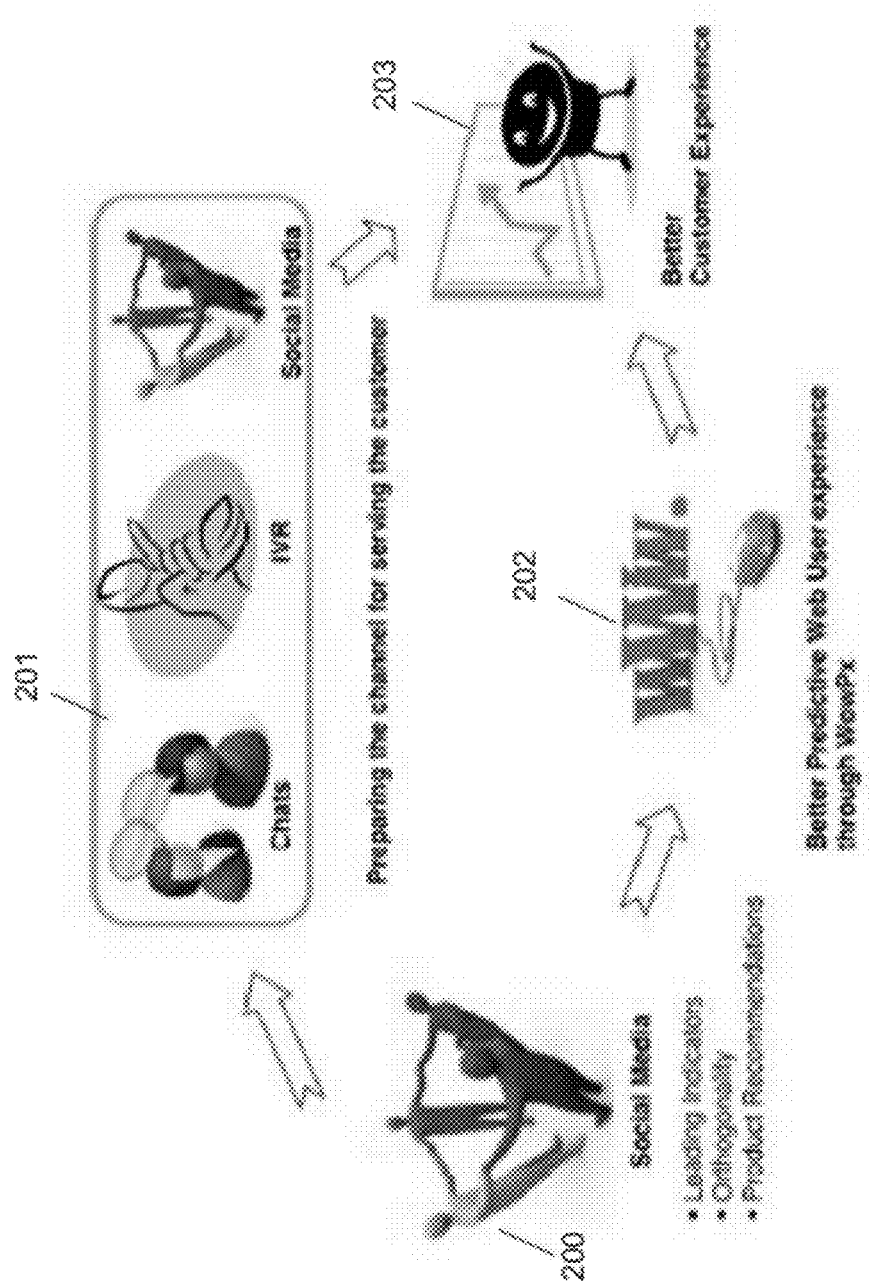
FIG. 20 shows the servicing customers where they need help in social media.

An embodiment takes advantage of social media in any of several ways. For example, one or more channels can be prepared to serve the customer better or a better predictive Web experience can be provided to the customer. Thus, embodiments are provided for both agent-based customer service and self-service. Self-service, for example via a web-based or other self service widget, provides significant cost savings in customer service organizations and also improves the customer experience. See FIG. 20, in which social media 200 is shown providing inputs to the customer channel 201 and to predictive technology 202 to improve the customer experience 203.

Service Anywhere

Service anywhere is an embodiment of the invention that provides service to a customer in their channel of choice. For example, service is offered to someone who follows a company on a social medium such as Twitter, when and where they need it. This can be accomplished by text mining of social media. In this example, a key influencer can be monitored on a company's social media and their tweets can be mined to provide a service anywhere function. For example, someone has an issue and they express it on Twitter. A URL or a proactive chat window, or a guided self-service widget, is provided to this person to address the problem or issue that the user is facing and that the user posted about. This is, or can be, provided to the user on Twitter, i.e. in the channel where the person expressed the issue.

Social Media Mining—Sentiment Analyzer

Social media mining, in connection with embodiment of the invention, comprises, for example, such features as:

Sentiment analyzer;
Competitive analysis;
Emerging memes; and
Insights engine.

Figure 21:
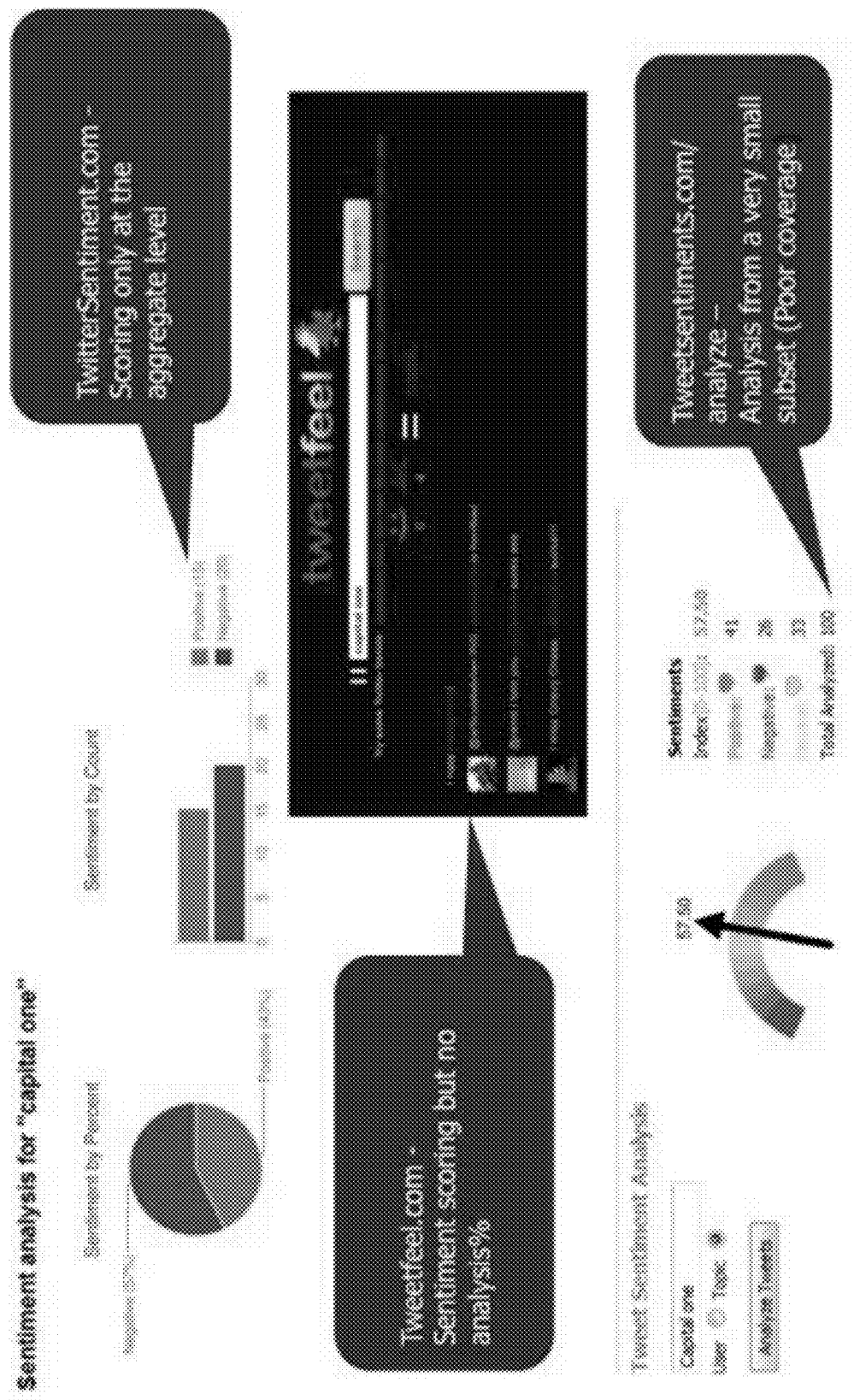
FIG. 21 shows a Twitter sentiment analyser.

Others are known, for example, as shown in FIG. 21, which shows state of the art sentiment analysis.

In an embodiment of the invention, business concerns that are addressed include, for example:

How am I placed amongst my customers?
What worked & What didn't with my customers?
How do we do?
  Competitors sentiment analysis
  Topic-based sentiment analysis The sentiment analyser disclosed herein identifies sentiment polarity from social media text and chats and provides a sentiment strength score for the given input text. The NES model (described in U.S. patent application Ser. No. 12/604, 252; shown in FIG. 21), while good for chats, is not useful for micro-blogs, such as Twitter, For example, NES requires hand-picked sentiment phrases from chats for training.

In contrast thereto, the herein disclosed sentiment analyzer can be used for both chats and social media texts, and can be used even if there is no sentiment-tagged dataset available for chats.

The herein disclosed sentiment analyser uses a supervised approach using labelled data. A set of tweets (typically 1000-3000) are manually tagged/labelled as negative and positive sentiment tweets. The negative sentiment associated with each of the words is determined by calculating its normalized likelihood on negative tweets. The same is done for positive sentiments associated with a word based on the likelihood to occur in a positive tweet. A Bayesian model is used to calculate the negative sentiment of the sentence by combining the individual word's sentiment scores. The model uses unigrams and bi-grams as features.

An unsupervised approach is also applied, using open-source sentiment dictionaries, such as SentiWordNet 3.0 (a WordNet based dictionary for words and sentiments), SentiStrength's slang terms dictionary (a dictionary for words and slang terms commonly used in social texts), and SentiStrength's emotion-icons dictionary (a dictionary for emotion icons used in social texts and chats).

In an embodiment, this works as follows:
Step 1: The open source dictionaries provide a sentiment score for each of a list of words, which typically are used to express a sentiment.
Step 2: In the corpus being analyzed for sentiment, the words that are part of the sentiment dictionary are identified and their score is obtained.
Step 3: The scores for all these sentiment words in a document or a tweet are summed up to provide a sentiment score for that particular document or tweet.
Step 4: This score can now be normalized by dividing by the total number of words in the document.

Figure 22:
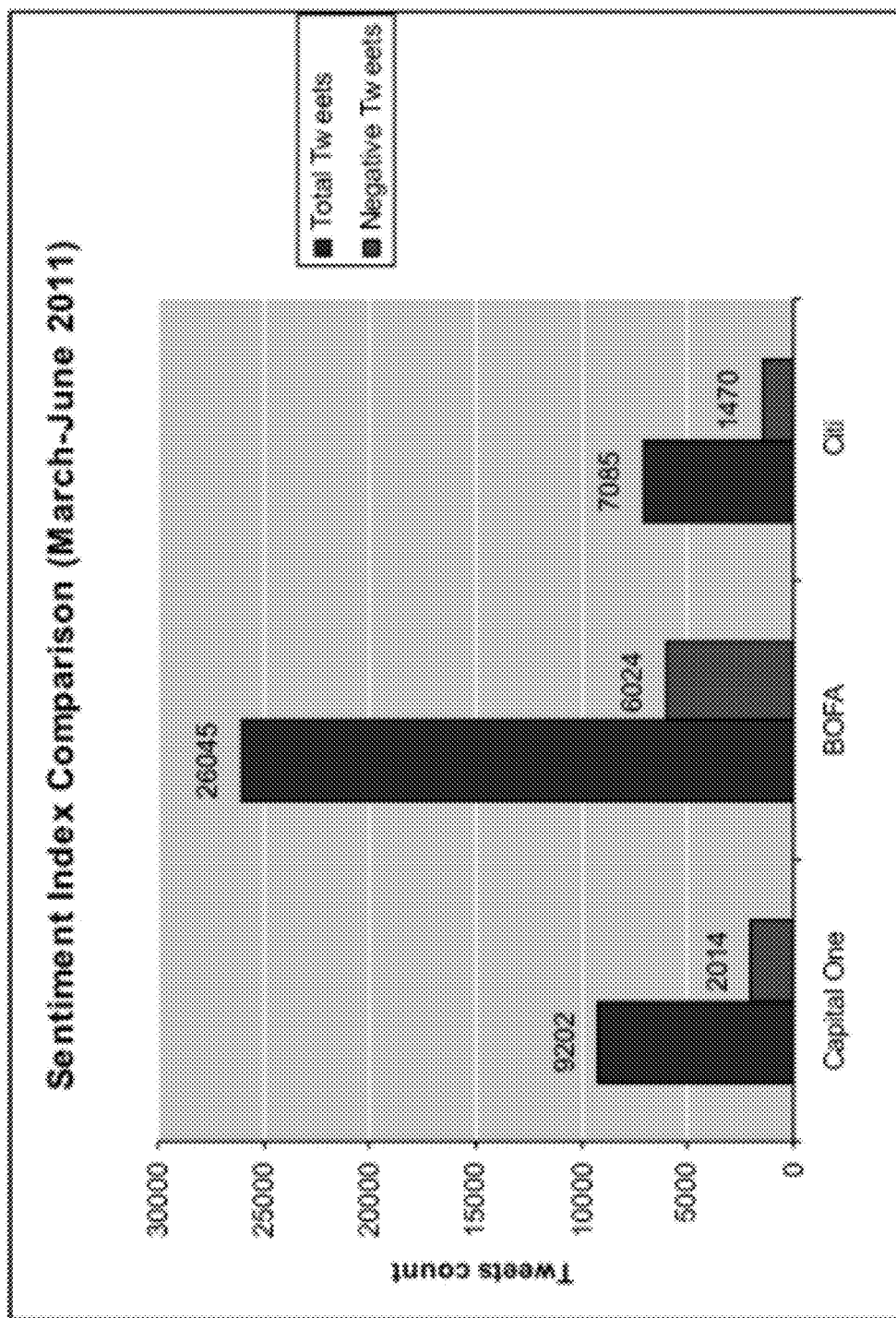
FIG. 22 is a graph that shows a competitors sentiment analysis.

FIG. 22 is a graph that shows a competitors' sentiment analysis produced according to the invention.

Figure 23:
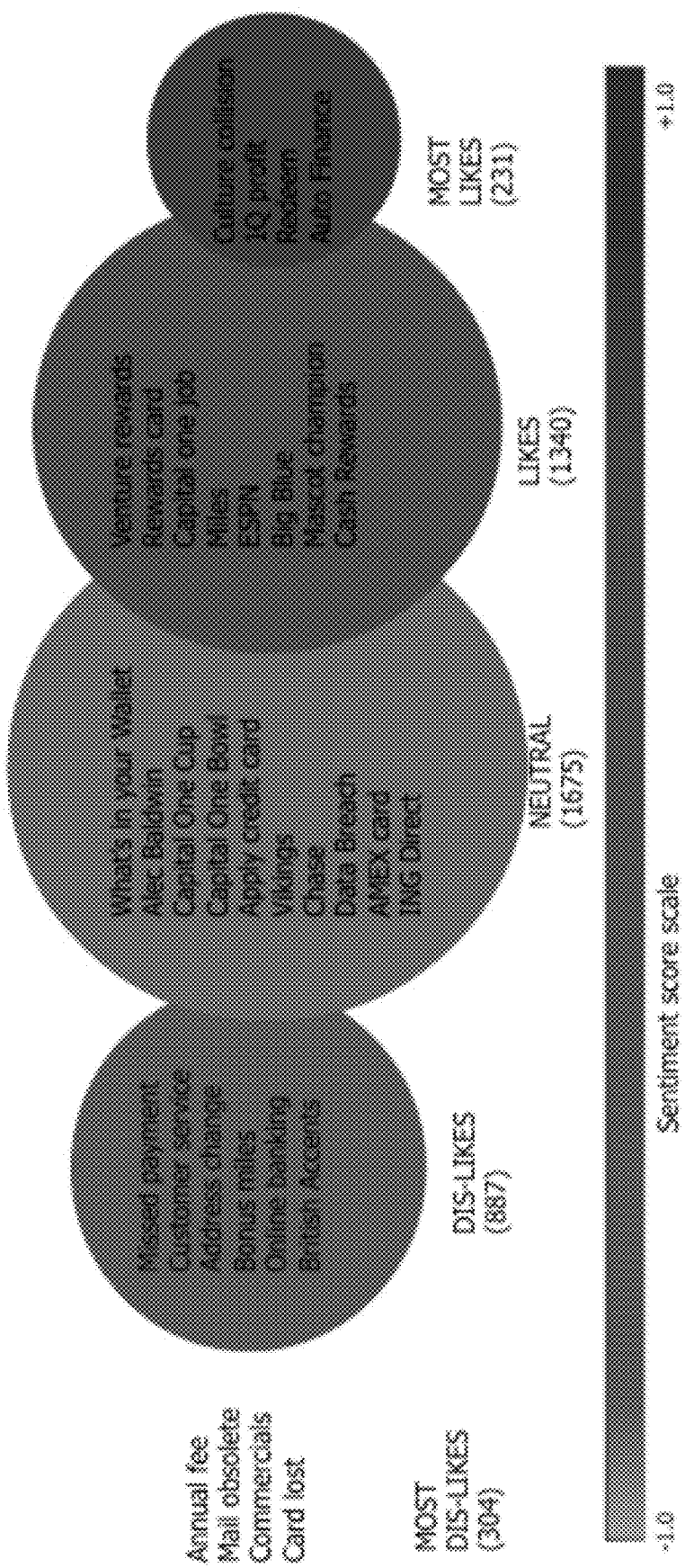
FIG. 23 is a graphic illustration that shows topic-level sentiment capturing in Twitter.

FIG. 23 is a graphic illustration that shows topic-level sentiment capturing in Twitter along a sentiment score scale. This aspect of the invention provides a snapshot of consumer sentiment across a broad range of issues that may affect a merchant. This scale is produced in this particular case by assuming each positive or negative term to be equivalent, i.e. each positive term has a score of 1 and each negative term has a score of −1. Then the score is calculated as (#Positive terms−#Negative terms)/(#Positive terms+#Negative terms).

Social Media Mining—The Long Tail for Emerging Memes

Figure 24:
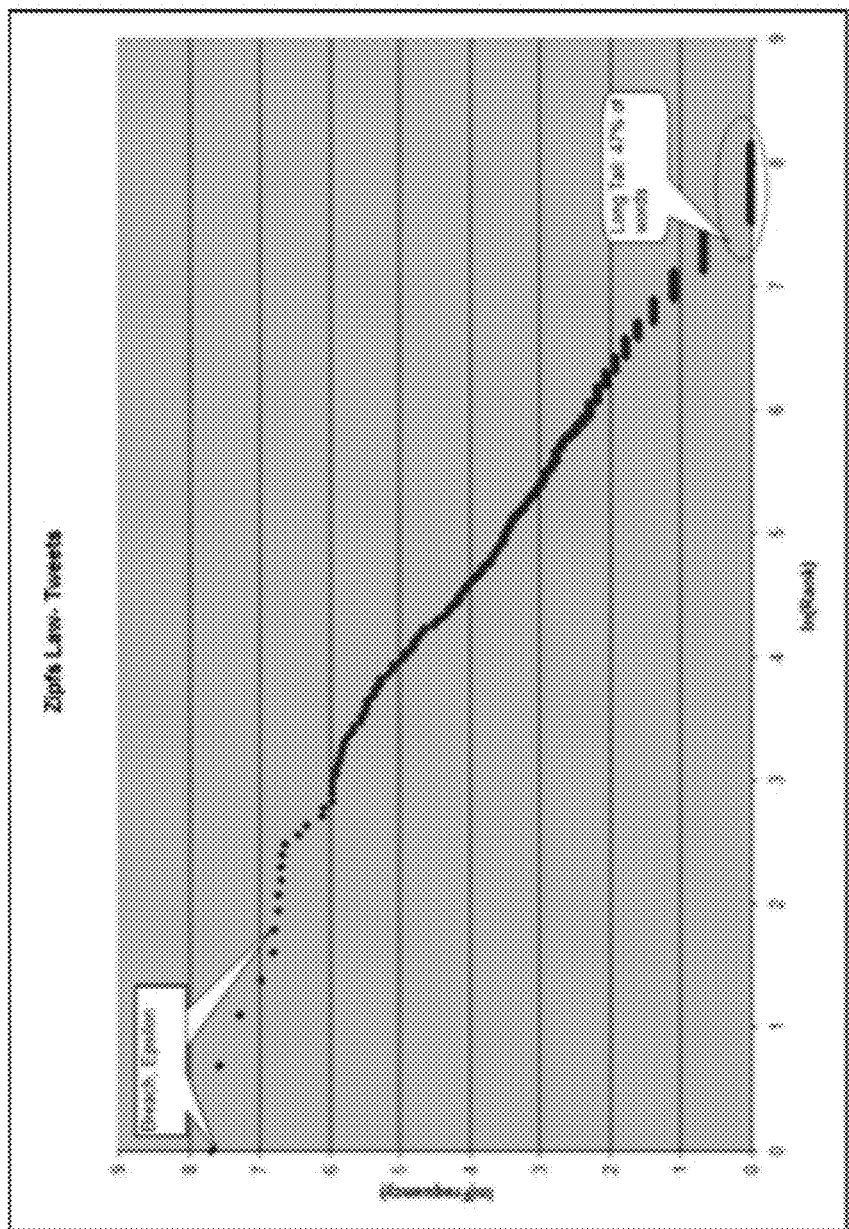
FIG. 24 is a graph that shows tail words that help to identify unique issues and their trends.

The term Long Tail (see C. Anderson, *The Long Tail: Why the Future of Business Is Selling Less of More, The Long Tail: Why the Future of Business Is Selling Less of More*, ISBN 1-4013-0237-8) has gained popularity in recent times as describing the retailing strategy of selling a large number of unique items with relatively small quantities sold of each, usually in addition to selling fewer popular items in large quantities. FIG. 24 is a graph that shows long tail words that help to identify unique issues and their trends. In FIG. 24, trends in chats/social media can be associated with unique features. According to Zipf's Law, the frequency of any word is inversely proportional to its rank in frequency table. Thus, the majority of the words and hence features have very low frequency (tail). The long tail is considered important because much information is contained within it.

Figure 25:
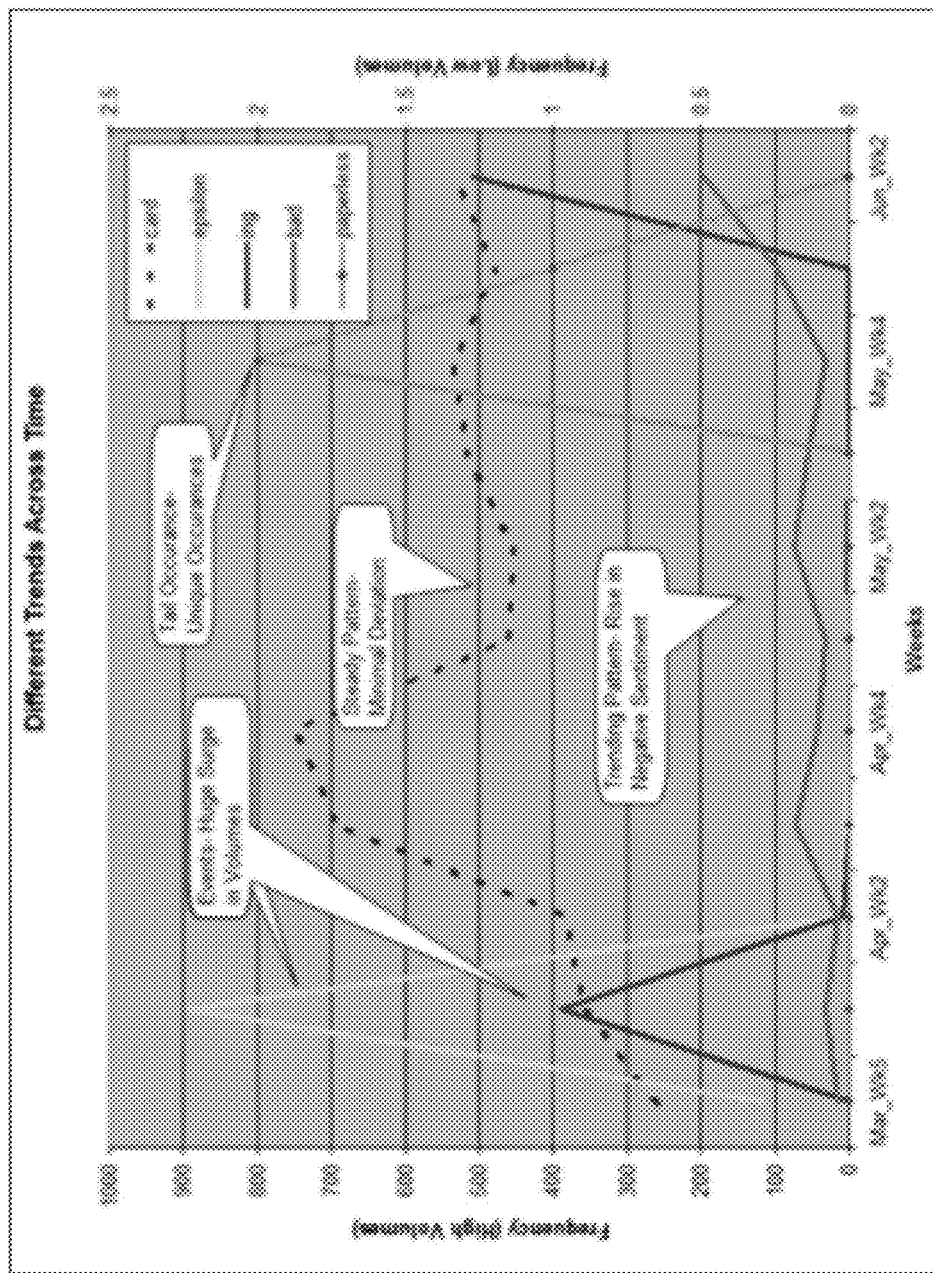
FIG. 25 is a graph that shows that the unique occurrence in time with Low frequency is an interesting phenomena.

FIG. 25 is a graph that shows that the unique occurrences in time with low frequency represent an interesting phenomena. For example, consider that what is wanted by the customer is paperless billing. Thus, the uniqueness of a feature can be two fold, across weeks and within a week. Note that interesting insights can come from these rare long tail events.

Figure 26:
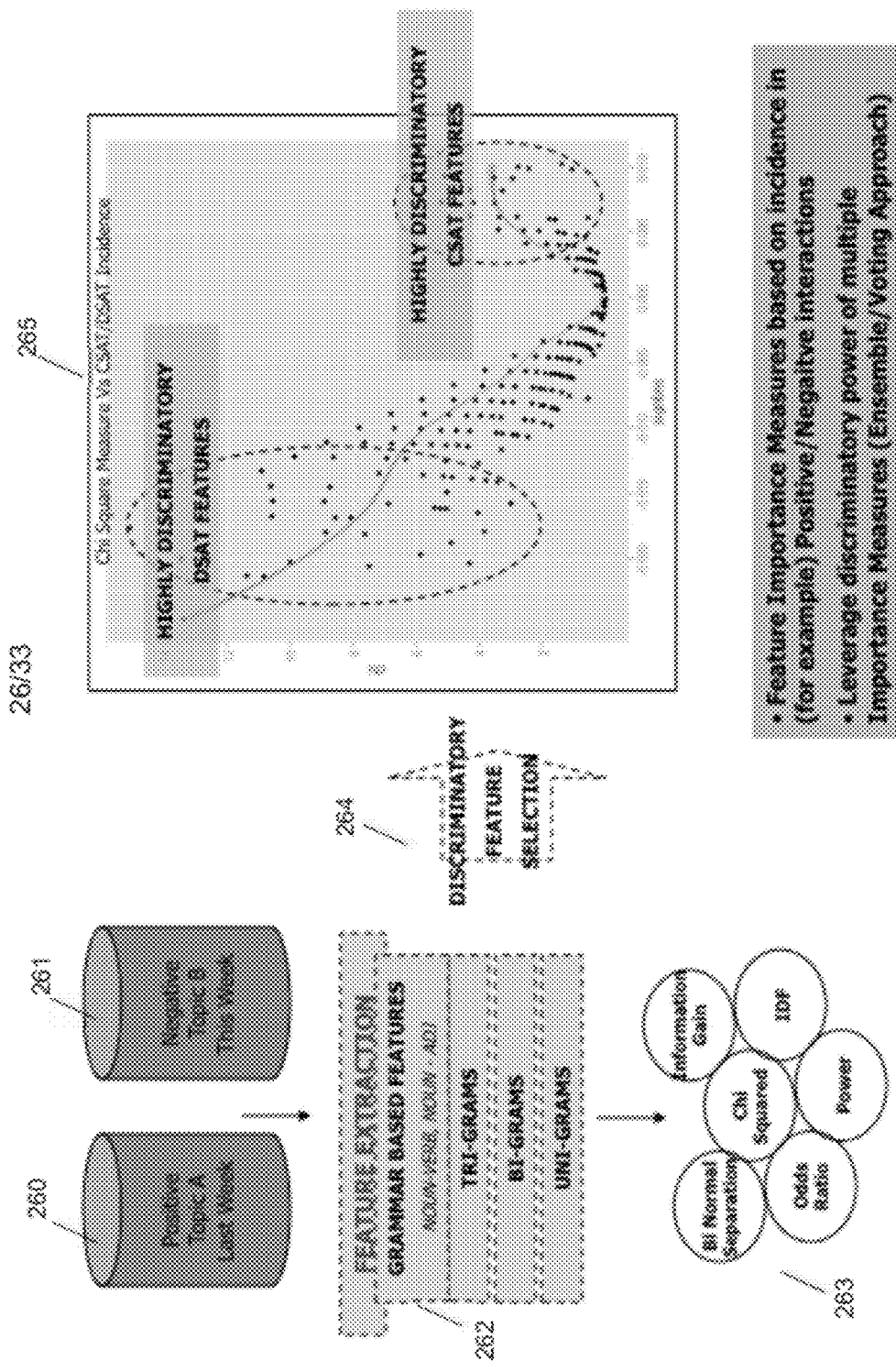
FIG. 26 is a block schematic diagram that shows an insights engine and discriminatory interaction features.

FIG. 26 is a block schematic diagram that shows an insights engine and discriminatory interaction features. In FIG. 26, a text base for positive topic A for the previous week 260 and a text base for a negative topic B for the current week 261 are applied to a feature extraction engine 262. The feature extraction engine identifies such text features as tri-grams, bi-grams, and uni-grams to which an ensemble of feature importance measures 263 is applied. Such feature importance measures can include, for example, bi-normal separation, information gain, chi-squared, odds ratio, inverse document frequency (IDF), and power. The specific discriminant algorithms are not key the invention because they are obtained from existing literature (see *Choose Your Words Carefully: An Empirical Study of Feature Selection Metrics for Text Classification*, George Forman Software Technology Laboratory, HP Laboratories, Palo Alto). The application of these algorithms to identify insights is key to the invention. A key aspect of the invention, in summary, is the following:

Take any two buckets of textual data, e.g. chats/tweets from last week vs. this week, or DSAT chats/tweets vs. CSAT chats/tweets, resolved chats/tweets vs. unresolved chats/tweets. The algorithm finds the features/sentences that are the most discriminating between the buckets. So one would come up with the sentences that potentially drive the CSAT or DSAT, etc. From the application of the feature importance measures to the extracted features discriminatory feature selection is accomplished 264. This, in turn, produces a representation of the feature values 265, for example showing highly discriminatory DSAT features clustered in a first region and highly discriminatory CSAT features clustered in a different region. Thus, feature importance measures are developed that are based upon incidence, for example, in positive/negative interactions. This aspect of the invention leverages the discriminatory power of multiple importance measures and provides an ensemble/voting approach to determining customer sentiment. The discriminatory features can be obtained by the output of a weighted averaging of the different algorithms. The weights themselves are learnt over time by users voting on the efficacy of the insights that come with the use of different weights.

Case Study: Leveraging Social Media for Customer Care

Mining social media to drive better customer care is a key business motivation for providing embodiment of the invention. For example, by the time the sales floor knows about a customer issue it is typically too late because customers are unhappy. Accordingly, the invention provides a technique for new issue identification. For example, in Twitter new issues are always emerging, but agents are not prepared to handle them. Some issues explode in volume and typically drive extreme negative sentiments. Often social media is a leading indicator of these issues. Further, recommendations for product purchase can be made where new products get introduced continuously and the monthly/quarterly product level training provided is not enough to keep agents knowledgeable. The competitive landscape is changing and agents need a current view of competitive position of the product. Thus, a key feature of this embodiment of the invention is leveraging the dynamism of social media to improve performance of chat and other customer care channels.

Figure 27:
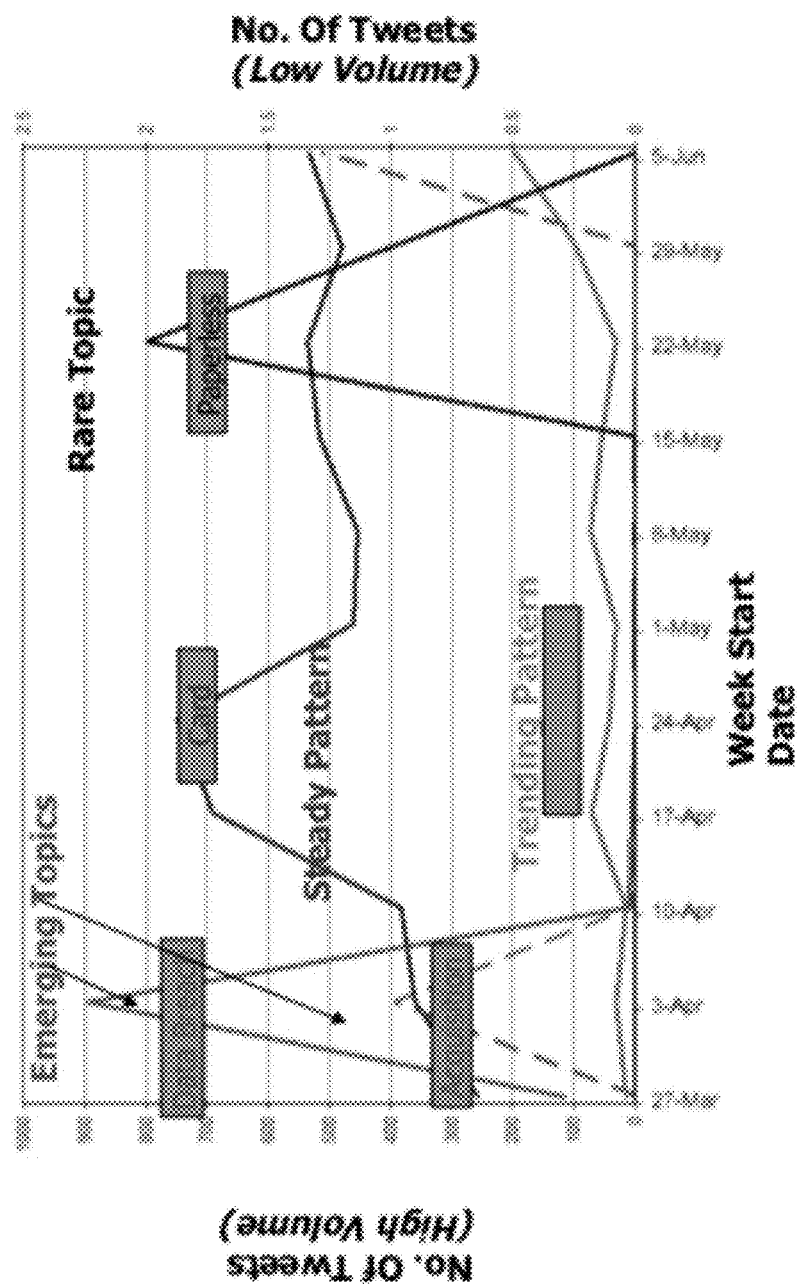
FIG. 27 is a graph that shows the dynamism of changing issues captured by social media.

FIG. 27 is a graph that shows the dynamism of changing issues captured by social media. In FIG. 27, a steady pattern (Card) is shown, i.e. the sentiment that "Trust Bank has always served me well from credit card to checking account." Emerging topics are also addressed, such as a data breach, e.g. "Trust bank E-mail Vendor Epsilon Reports That trust bank Customer E-mail Addresses Were Accessed," or an acquisition, i.e. "Trust Bank To Make Bid for New Bank." Further, trending patterns, such as negative sentiments are revealed, i.e. "Just had the most incomprehensible, ridiculous discussion with Trust Bank about my credit card. Bad business and stupid policies." Additionally, rare topics are addressed, such as paperless business transactions, i.e. "I wish Trust Bank offered paperless billing."

Figure 28:
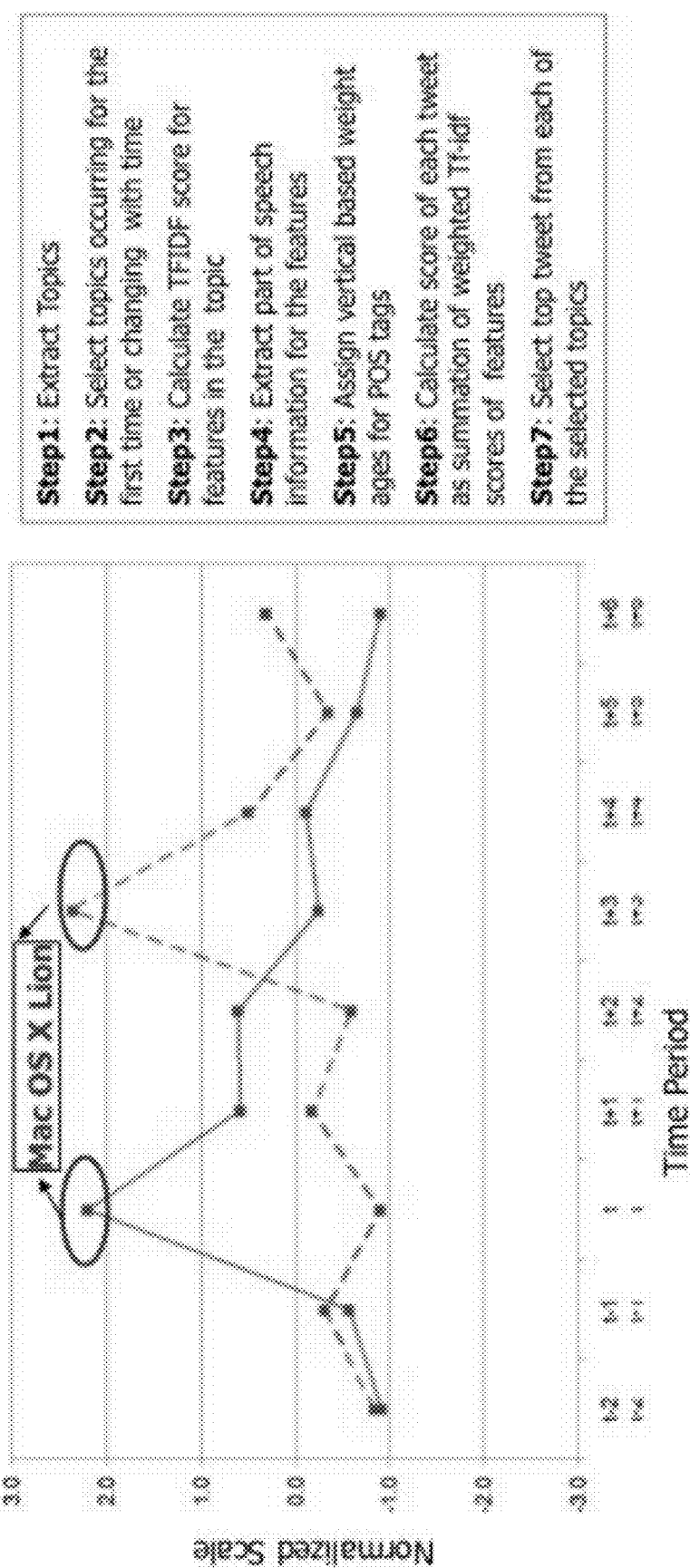
FIG. 28 is a graph that shows the process of identifying emerging topics as a leading indicator to other channels.

FIG. 28 is a graph that shows the process of identifying emerging topics as a leading indicator to other channels. In FIG. 28, Mac OS Lion tweets are shown over time with regard to any news on compatibility issues with MacOSX Lion, such as: "XXX post on compatibility issues with Mac OS X Lion. Might want to check before you upgrade." Mac OS Lion chats are also shown over time, e.g.:

"All that I want to know, is that, It will work Tomorrow, when I download Mac OSLion? Just wondering if it will run on the new OS Lion?"

For the information shown in FIG. 28, the invention executes the following steps:

Step 1: Extract topics;
Step 2: Select topics that are occurring for the first time or that are changing with time;
Step 3: Calculate the term frequency inverse document frequency (TFIDF) score for features in the topic (see http://en.wikipedia.org/wiki/Tf%E2%80%93idf);
Step 4: Extract part of speech information for the features;
Step 5: Assign vertical based weight ages for POS tags (see http://en.wikipedia.org/wiki/Part-of-speech_tagging);
Step 6: Calculate the score of each tweet as a summation of weighted TFIDF scores of features. The weighting is described in FIG. 28, i.e. some POS tags are weighted higher than others. The idea is that some parts of speech are more likely to identify an issue than others, for example an adjective/noun combination (high bill); and
Step 7: Select the top tweet from each of the selected topics.

Figure 29:
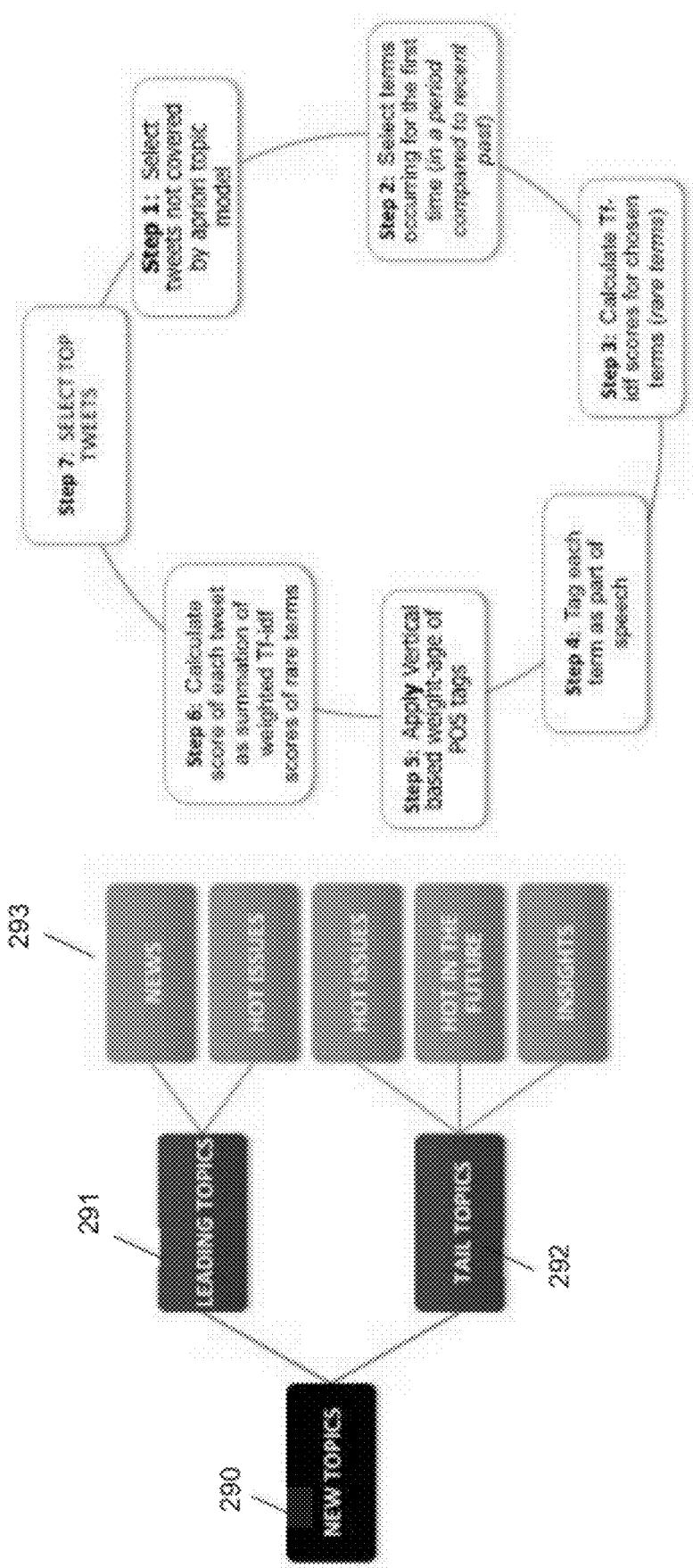
FIG. 29 is a flow diagram that shows how to identify rare events/topics that can yield powerful insights.

FIG. 29 is a flow diagram that shows how to identify rare events/topics that can yield powerful insights. As shown in FIG. 29:

Step 1: Select tweets that are not covered by an a priori topic model, e.g.: "So much for environmentally friendly companies these days . . . ; My Trust Bank cc must send paper statements?? No paperless option—#FAIL; Dear trust bank, your automated system is extensive, but has very few choices; Data Breach exposes Chase, Capital One, TiVo, Krogers, US Bank customers http://t.co/oGXNcS1 via @cnet—Were you affected? Better check." Both tweets and chats are also selectable, e.g.: 'Why doesn't Trust bank have a mobile android app?—Tweet . . . ; I have a droid and wanted to know if you guys have a app for online . . . —Chat; also is there an app for droid on here for this?—Chat."
Step 2: Select terms occurring for the first time in a period compared to the recent past.
Step 3: Calculate the TFIDF scores for the chosen terms, e.g. rare terms.
Step 4: Tag each term as a part of speech.
Step 5: Apply vertical based weightage of point of sale (POS) tags.
Step 6: Calculate the score of each tweet as the summation of weighted TFIDF scores of rare terms.
Step 7: Select the top tweets.

Thus, in FIG. 29, the methodology is applied to new topics 290 to identify leading topics 291 and tail topics 292. This yields useful information 293 which includes, for leading topics, news and hot issues; and which includes, for tail topics, hot issues, hot in the future, and insights.

Figure 30:
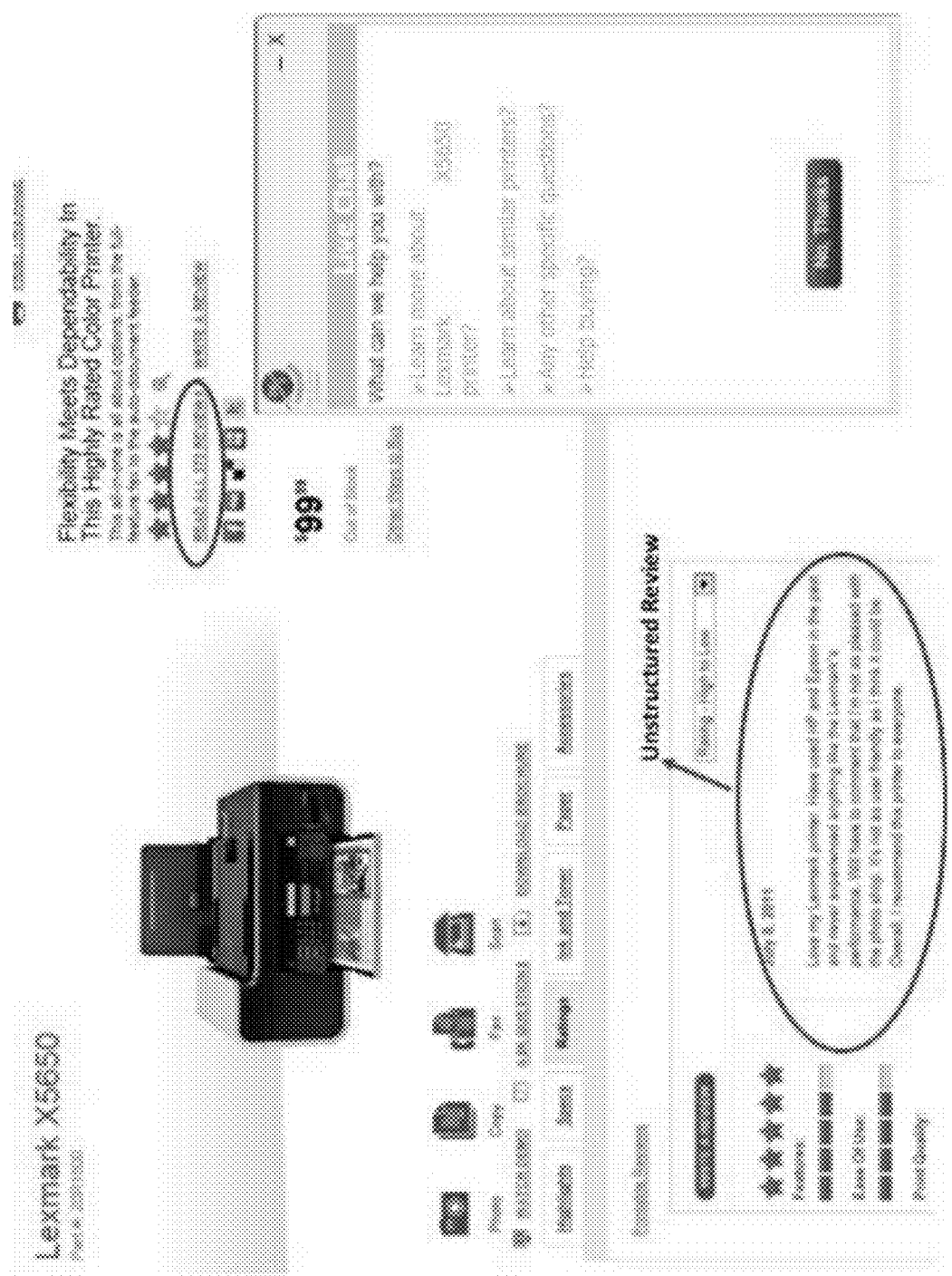
FIG. 30 is a Web page that shows how proactive customer care is enhanced by product recommendations.

FIG. 30 is a Web page that shows how proactive customer care is enhanced by product recommendations. The recommendation proceeds from structured and unstructured reviews to support the customer service agents. Thus, the herein disclosed product recommendation engine is an engine for summarizing product details from structured reviews and unstructured user reviews. An embodiment of the invention uses the product recommendation engine for better equipping the agents for making better sales pitches to customers. In this regard, extracting product details from structured reviews becomes an information extraction problem (see McCallum et al.). It is necessary to look at unstructured reviews because structured reviews do not throw light on user feedback. Real-world, hands-on experience and problems are more discussed in unstructured user reviews. A structured review on a washing machine would talk about its weight, capacity, etc., but would not talk about the water flow problem in it. Customers generally express pros and cons in terms of specific product attributes.

Figure 31:
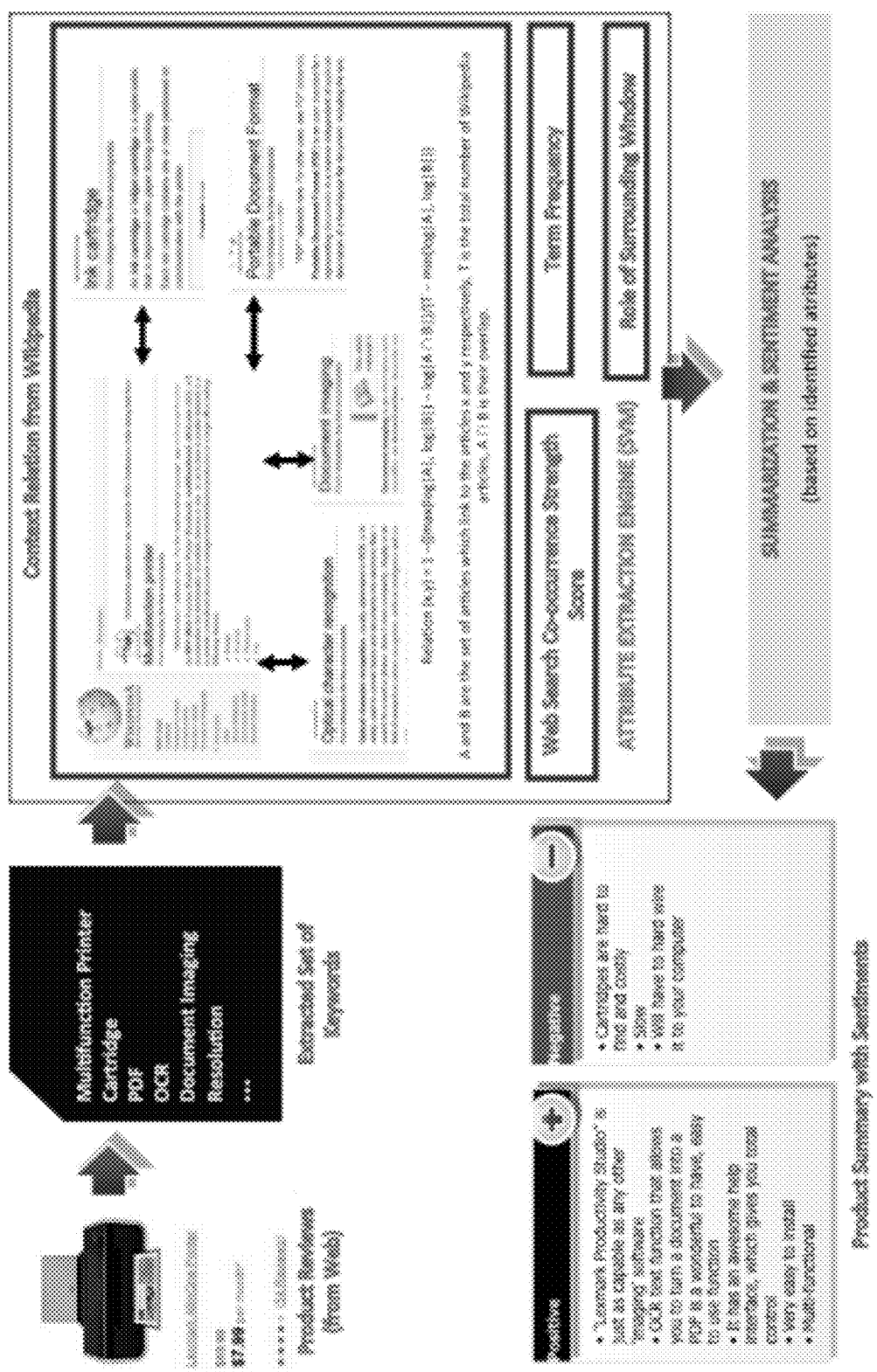
FIG. 31 is a flow diagram that shows how the product recommendation engine leverages summarization and sentiment analysis.

FIG. 31 is a flow diagram that shows how the product recommendation engine leverages summarization and sentiment analysis. In the example of FIG. 31, using the link structured in Wikipedia allows the system to quantify the context relationship between a product and a feature. With regard to the product recommendation engine, reviews consist of free writing and professional's reviews, etc. In an embodiment of the invention, both are used. For instance, reviews give specific examples of dishwasher as in a paper. A flow chart of the process proceeds, for example, for reviews, where attributes are extracted. Embodiments of the invention show each stage of such extraction, e.g. Wikipedia, frequency, SW, Web. The engine solves the recommendation problem as a summarization problem, not just structured attribute extraction, because structured reviews do not have good user feedback. From the set of collected reviews for a given product, a set of keywords is developed which comprise possible attributes for the given product. The system identifies if these set of keywords are really attributes when the attribute extraction engine performs the role of semantically determining if a given keyword is an attribute or not. Different parameters are used to determine the relationship between the possible attribute and the given product, e.g. context relation using Wikipedia based on term frequency in the given set of reviews, the role of a surrounding window, i.e. how often this particular attribute is mentioned along with the product within a given context window, for example where the window size based on experiment is five terms. A Web search determines co-occurrence strength, i.e. how often these two are mentioned, measured based on the results/hits count, for example using the Bing API. These features are used as input features for the model to determine if a given word is an attribute. Once prospective attributes are identified, the lines consisting of these keywords are fed as input for the summarization and sentiment analysis engine. Sentiment analysis is performed at the attribute level to determine individual attribute's sentiment. Extractive summarization is then performed, picking up lines from the existing texts and not generating, on the lines with key attributes and high sentiment scores.

Figure 32:
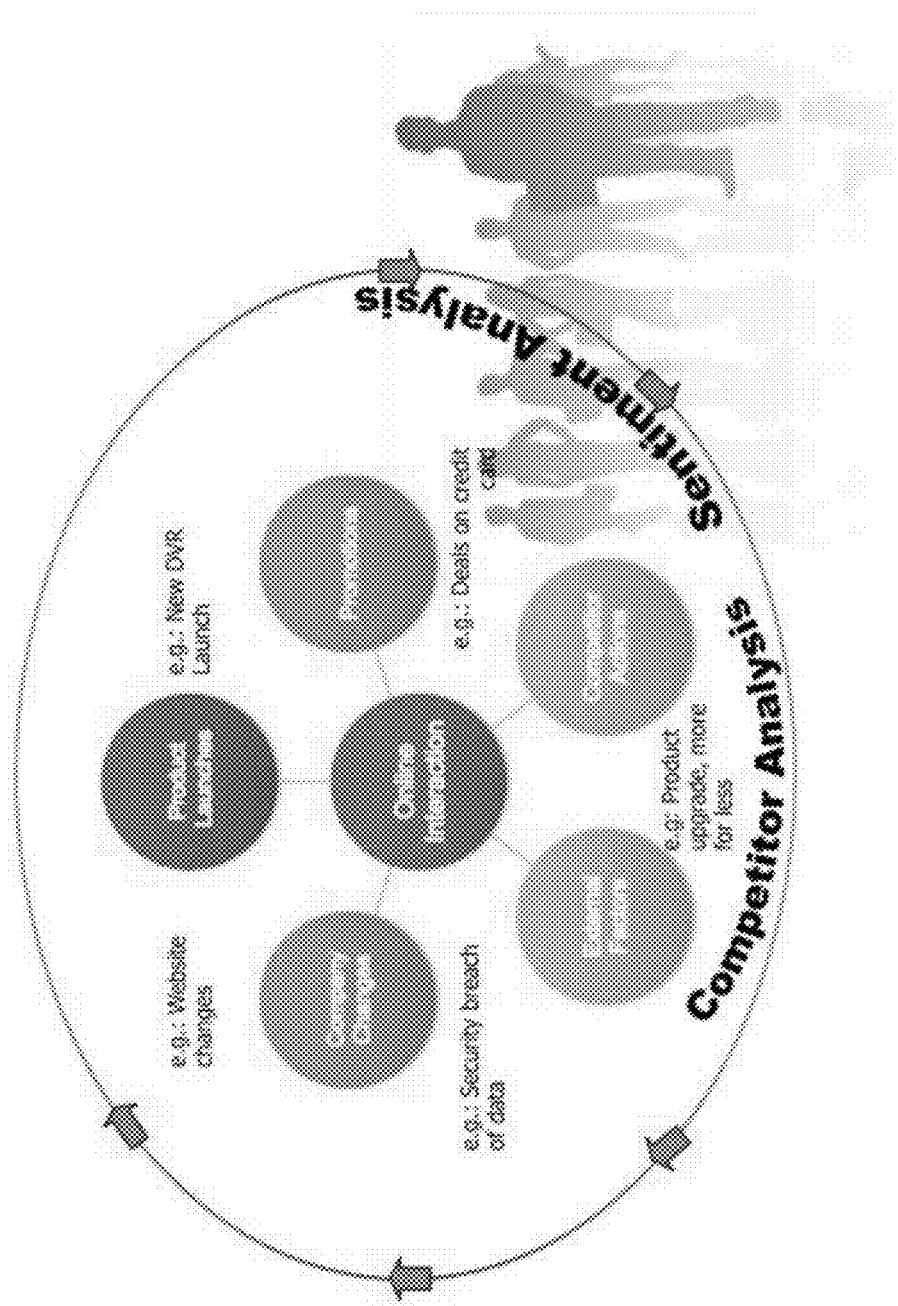
FIG. 32 is a flow diagram that shows different tools that are used to drive better customer care via social media.

FIG. 32 is a flow diagram that shows different tools that are used to drive better customer care via social media. In connection with the invention, social media analytics does not stop with typical sentiment analysis. There is also a focus on better customer service with the help of strong social media analytics through various dimensions which involve emerging memes, product recommendations for sales chats, competitor analysis, and sentiment analysis.

Computer Implementation

Figure 33:
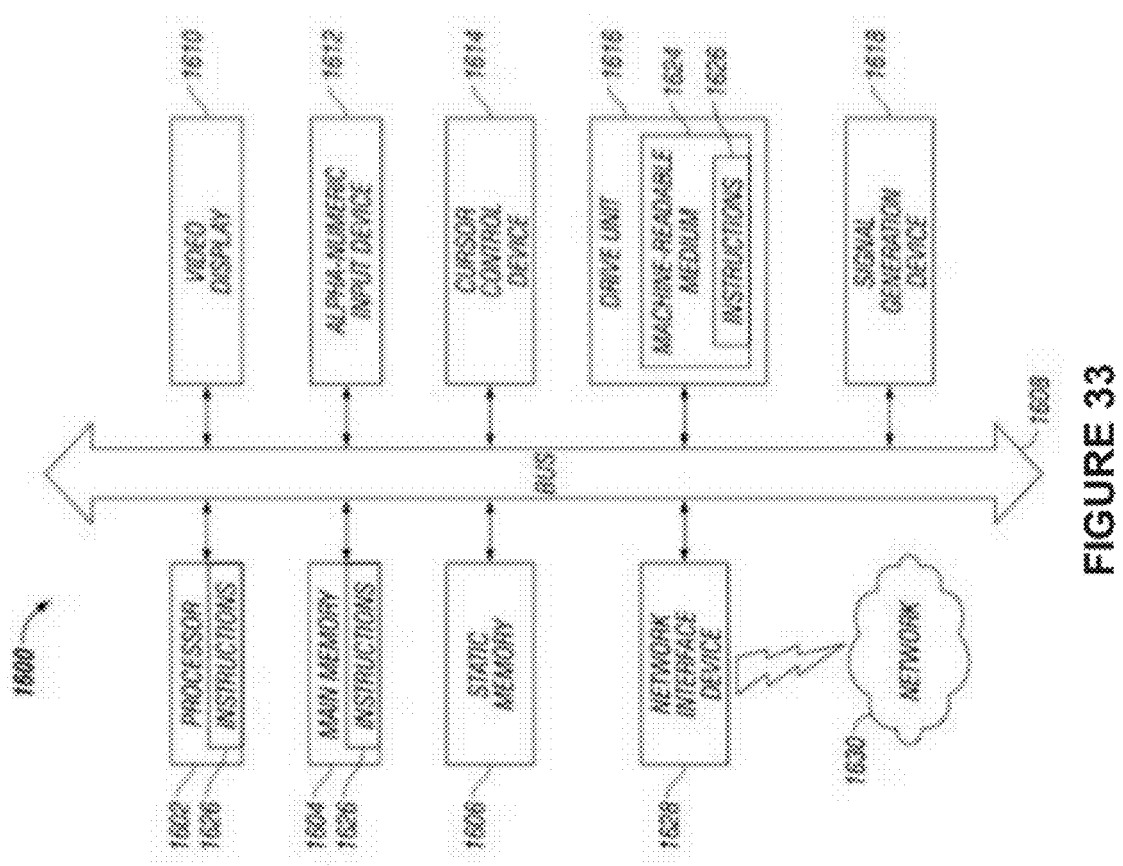
FIG. 33 is a block schematic diagram of a machine in the exemplary form of a computer system within which a set of instructions for causing the machine to perform any one of the foregoing methodologies may be executed.

FIG. 33 is a block schematic diagram of a machine in the exemplary form of a computer system 1600 within which a set of instructions for causing the machine to perform any one of the foregoing methodologies may be executed. In alternative embodiments, the machine may comprise or include a network router, a network switch, a network bridge, personal digital assistant (PDA), a cellular telephone, a Web appliance or any machine capable of executing or transmitting a sequence of instructions that specify actions to be taken.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1628.

The disk drive unit 1616 includes a machine-readable medium 1624 on which is stored a set of executable instructions, i.e., software, 1626 embodying any one, or all, of the methodologies described herein below. The software 1626 is also shown to reside, completely or at least partially, within the main memory 1604 and/or within the processor 1602. The software 1626 may further be transmitted or received over a network 1630 by means of a network interface device 1628.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g., a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. An apparatus for quantizing community interactions with social media to understand and influence consumer experiences, the apparatus comprising:
a processor configured for analyzing posts on social media for use in customer service to improve brand and customer experience;
said processor configured for determining one or more leading indicators of issues that appear in a consumer contact channel by
mining said posts,
extracting topics from said posts,
selecting those topics that are occurring for a first time or whose frequency of occurring is changing over time,
calculating a term frequency inverse document frequency (TFIDF) score for each feature in each selected topic,
assigning a weight to each TFIDF score,
calculating a score for each of said posts by summing the weighted TFIDF scores of all features within each post, and
selecting top posts from each selected topic;
said processor configured for predicting a trend in future consumer contact channel activity based on said leading indicators and the analysis of said posts;
said processor configured for identifying one or more key influencers from social media; and
said processor configured for, once said key influencers are identified, contacting said key influencers to influence said key influencers.

2. The apparatus of claim 1, said processor configured for:
using social media for any of identifying a spike in activity, identifying questions around the spike, or, in a call center application, determining plan staffing and planning an issue response in advance.

3. The apparatus of claim 1, said processor configured for:
applying a model to quantify the influence of said key influencers.

4. The apparatus of claim 1, said processor configured for:
determining an influencer trust score for each of said key influencers, where Trust Score=$w_1$(agreement)+$w_2$(Opposition)+$w_3$(retweets)+$w_4$(References), and wherein the weights are optimized based on a manual ranking of each attribute.

5. The apparatus of claim 4, said processor configured for:
tracking a subset of said key influencers in a community on a social medium, wherein the subset is composed of those influencers having the highest influencer trust scores;
measuring customer sentiments; and
if a negative trend in customer sentiment is identified, contacting customers with a resolution message to create a positive trend.

6. The apparatus of claim 5, wherein the subset of said key influencers is determined by aggregating the influencer trust score for each influencer;
wherein each of said influencer trust scores is a numerical sum of instances of a particular attribute; and
wherein said influencer trust scores are normalized to an average number of posts from posters in that population.

7. The apparatus of claim 5, said processor configured for:
providing a model for scoring said key influencers, in which every post is weighted based upon the influence of a person making the post to yield a net impact score;
wherein factors that make up influence include any of engagement, trust, or a poster's network.

8. The apparatus of claim 5, said processor configured for:
identifying influence that an influencer exerts over others; and
providing a path to remediation of an influencer's issues that creates a net media positive trend in social media.

9. The apparatus of claim 5, said processor configured for:
monitoring a particular key influencer on a company's social media; and
mining said particular key influencer's posts to provide a service anywhere function that provides service in a channel of said particular key influencer's choice.

10. The apparatus of claim 1, said processor configured for:
using knowledge of said leading indicators and said key influencers to respond preemptively, either through a particular key influencer and/or through preparing for issues arising later in other customer care channels;
wherein the key issues are identified using a topic model and/or an issue categorization model.

11. The apparatus of claim 1, said processor configured for:
preparing one or more channels to serve a customer better and/or to provide a better predictive experience to the customer for both agent-based customer service and self-service.

12. The apparatus of claim 1, said processor configured for:
providing service to a customer in a customer's channel of choice when and where the customer needs it by text mining social media.

13. The apparatus of claim 1, said processor configured for:
providing any of a URL, a proactive chat window, or a guided self-service widget to a user to address a problem and/or an issue that the user is facing and that the user posted about in a channel where the user expressed the issue.

14. The apparatus of claim 1, said processor configured for:
providing a sentiment analyser that identifies sentiment polarity from social media text and/or chats and that provides a sentiment strength score for a given input text.

15. The apparatus of claim 14, said sentiment analyzer configured for:
using a supervised approach using labelled data;
wherein a set of posts are manually tagged/labelled as negative and positive sentiment posts;
wherein negative sentiment associated with each word in a post is determined by calculating its normalized likelihood on negative posts; and
wherein positive sentiment associated with each word in a post is determined by calculating its normalized likelihood on positive posts; and
using a Bayesian model to calculate a negative sentiment of a sentence by combining an individual word's sentiment scores;
wherein unigrams and bi-grams are used as features.

16. The apparatus of claim 14, said sentiment analyzer configured for:

using an unsupervised approach using sentiment dictionaries to provide a sentiment score for each of a list of words which are used to express a sentiment;

wherein in a corpus being analyzed for sentiment, words that are part of a sentiment dictionary are identified and their score is obtained;

wherein scores for all sentiment words in a document or a post are summed up to provide a sentiment score for that particular document or post; and wherein said sentiment score is normalized by dividing by a total number of words in the document.

17. The apparatus of claim 1, said processor configured for:

providing a snapshot of consumer sentiment across a broad range of issues that may affect a merchant.

18. The apparatus of claim 17, said processor configured for:

producing said snapshot by assuming each positive or negative term to be equivalent; and calculating a score as: (#Positive terms−#Negative terms)/(#Positive terms +#Negative terms).

19. The apparatus of claim 1, said processor configured for:

using words/features in a long tail of a word/feature statistical distribution to identify unique issues and their trends in chats/social media that are associated with unique features;

wherein frequency of any word is inversely proportional to its rank in a frequency table;

wherein a majority of words and, hence, features have very low frequency; and wherein unique occurrences in time with low frequency represent interesting phenomena.

20. The apparatus of claim 1, said processor configured for:

providing an insights engine for identifying discriminatory interaction features;

wherein a database for two juxtaposed features is applied to a feature extraction engine which identifies said juxtaposed features as tri-grams, bi-grams, and unigrams to which an ensemble of feature importance measures is applied; and wherein said feature importance measures comprise any of bi-normal separation, information gain, chi-squared, odds ratio, inverse document frequency (IDF), or power.

21. The apparatus of claim 20, said juxtaposed features comprising any of positive and negative topics, High CSAT vs. Low CSAT, Topic A vs. Topic B, Agent A vs. Agent B, or last week vs. this week.

22. The apparatus of claim 20, said insights engine configured to:

access any one or more sources of textual data;

find and extract features/sentences that are the most discriminating between the sources of textual data;

apply feature importance measures to the extracted features to effect discriminatory feature selection;

produce a representation of the feature importance measures;

develop additional feature importance measures based upon relative incidence in positive/negative interactions;

leverage discriminatory power of multiple importance measures to provide an ensemble/voting approach to determining customer sentiment;

wherein said discriminatory features are determined as an output of a weighted averaging, and wherein the weights are determined over time by users voting on efficacy of insights that come with the use of different weights.

23. The apparatus of claim 1, said processor configured for:

mining social media to drive better customer care via new issue identification, wherein said social media is used as a leading indicator of said new issues.

24. The apparatus of claim 23, said processor configured for:

making recommendations for product purchase where new products get introduced continuously and where monthly/quarterly product level training provided is not enough to keep agents knowledgeable.

25. The apparatus of claim 1, said processor configured for:

leveraging social media to improve performance of chat and other customer care channels.

26. The apparatus of claim 1, said processor configured for:

extracting parts of speech information for each feature in each selected topic; and assigning vertical based weightages for point of sale (POS) tags;

wherein some POS tags are weighted higher than others; and wherein some parts of speech are more likely to identify an issue than others.

27. The apparatus of claim 1, said processor configured for:

applying text mining to new topics to identify leading topics and tail topics.

28. The apparatus of claim 1, said processor configured for:

making recommendations based upon structured and unstructured reviews to support customer service agents.

29. The apparatus of claim 28, said processor configured for:

providing a product recommendation engine summarizing product details from structured reviews and unstructured user reviews;

extracting product details from unstructured reviews; and using said product recommendation engine to equip agents for making sales pitches to customers.

30. The apparatus of claim 29, said product recommendation engine configured for:

providing a summarization and sentiment analysis engine for leveraging summarization and sentiment analysis.

31. The apparatus of claim 29, said processor configured for:

using a link to quantify a context relationship between a product and a feature.

32. The apparatus of claim 29, said processor configured for:

from a set of collected reviews for a given product, developing a set of keywords/features which comprise possible attributes for a given product;

identifying if said set of keywords/features comprises attributes by using an attribute extraction engine to semantically determine if a given keyword/feature is an attribute or not;

using different parameters to determine a relationship between a possible attribute and a given product;

searching to determine a search co-occurrence strength measure based co-occurrence on a results/hits count;

using said parameters as input features for a model to determine if a given word is an attribute;

once prospective attributes are identified, inputting lines consisting of said keywords/features for said summarization and sentiment analysis engine;

performing sentiment analysis at the attribute level to determine individual attributes' sentiment; and picking up lines from existing texts that contain key attributes and the sentiment score.

33. The apparatus of claim 32, said processor configured for:

defining a weighting function/score for a combination of a frequency of occurrence of an attribute with a product and a sentiment associated with said attribute;

posting attributes with a highest score and a high scoring sentences associated with said highest scoring attributes as recommendations;

wherein said score identifies attribute characteristics that are most representative of a product; and wherein said score is associated with any of very good or very poor sentiments.

34. The apparatus of claim 1, said processor further configured for:

selecting posts that are not covered by an a priori topic model;

selecting rare terms occurring for a first time in a period compared to a recent past;

calculating term frequency inverse document frequency (TFIDF) scores for the rare terms;

tagging each rare term as a part of speech;

applying vertical based weightage of point of sale (POS) tags;

calculating a score of each post as a summation of weighted TFIDF scores of the rare terms; and selecting top posts.

* * * * *